US010667460B2

United States Patent
Koch et al.

(10) Patent No.: US 10,667,460 B2
(45) Date of Patent: *Jun. 2, 2020

(54) CROP INPUT VARIETY SELECTION SYSTEMS, METHODS, AND APPARATUS

(71) Applicant: Precision Planting LLC, Tremont, IL (US)

(72) Inventors: Dale Koch, Tremont, IL (US); Todd Swanson, Morton, IL (US)

(73) Assignee: Precision Planting LLC, Tremont, IL (US)

( * ) Notice: Subject to any disclaimer, the term of this patent is extended or adjusted under 35 U.S.C. 154(b) by 229 days.

This patent is subject to a terminal disclaimer.

(21) Appl. No.: 15/889,180

(22) Filed: Feb. 5, 2018

(65) Prior Publication Data

US 2018/0153093 A1    Jun. 7, 2018

Related U.S. Application Data

(63) Continuation of application No. 14/832,804, filed on Aug. 21, 2015, now Pat. No. 9,883,625.

(60) Provisional application No. 62/088,411, filed on Dec. 5, 2014, provisional application No. 62/040,205, filed on Aug. 21, 2014.

(51) Int. Cl.
| | |
|---|---|
| *A01C 7/10* | (2006.01) |
| *A01C 21/00* | (2006.01) |
| *A01C 7/04* | (2006.01) |
| *A01C 7/08* | (2006.01) |

(52) U.S. Cl.
CPC .............. *A01C 7/102* (2013.01); *A01C 7/046* (2013.01); *A01C 21/005* (2013.01); *A01C 7/081* (2013.01)

(58) Field of Classification Search
CPC .. A01C 7/102; A01C 7/10; A01C 7/08; A01C 7/00; A01C 7/046; A01C 7/044; A01C 7/042; A01C 7/04; A01C 21/005; A01C 21/00; A01C 7/081
See application file for complete search history.

(56) References Cited

U.S. PATENT DOCUMENTS

| | | | |
|---|---|---|---|
| 7,025,010 B2 | 4/2006 | Martin et al. | |
| 7,617,785 B2 | 11/2009 | Wendte | |
| 8,561,472 B2 | 10/2013 | Sauder et al. | |
| 9,179,594 B2 * | 11/2015 | Graham | A01C 7/04 |
| 9,883,625 B2 * | 2/2018 | Koch | A01C 7/046 |
| 2015/0059629 A1 * | 3/2015 | Kinzenbaw | A01C 7/044 111/200 |
| 2015/0223391 A1 * | 8/2015 | Wendte | A01C 7/04 111/177 |

FOREIGN PATENT DOCUMENTS

| | | |
|---|---|---|
| WO | 2012129442 A3 | 9/2012 |
| WO | 2013049198 A1 | 4/2013 |
| WO | 2014018717 A1 | 1/2014 |

* cited by examiner

*Primary Examiner* — Christopher J. Novosad

(57) ABSTRACT

Systems, methods and apparatus for selecting an agricultural input include first and second seed meters, which selectively meter seed from first and second sources, respectively, into a common planting trench. In some embodiments, the seed meters are selectively operated by electric motors controlled with reference to a seed type prescription. In some embodiments, the first and second seed meters deposit seeds along a common plane.

20 Claims, 33 Drawing Sheets

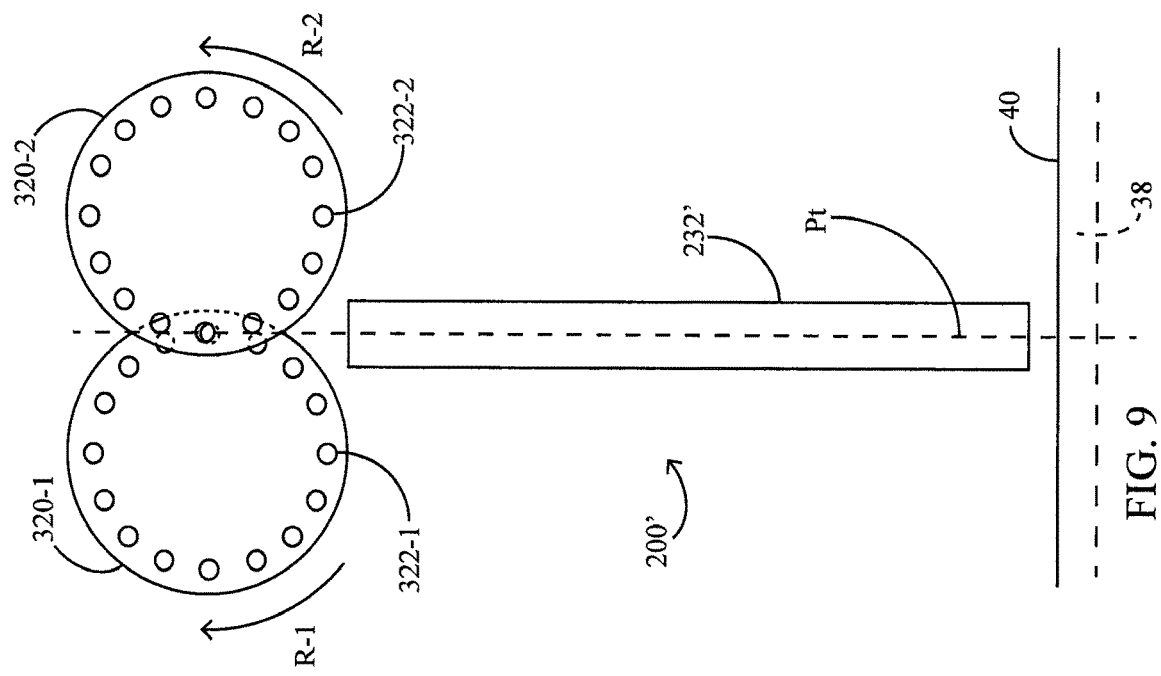
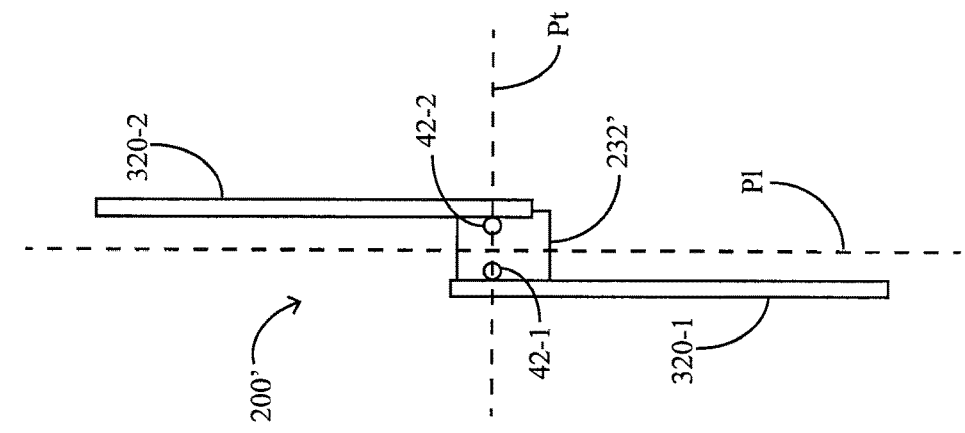
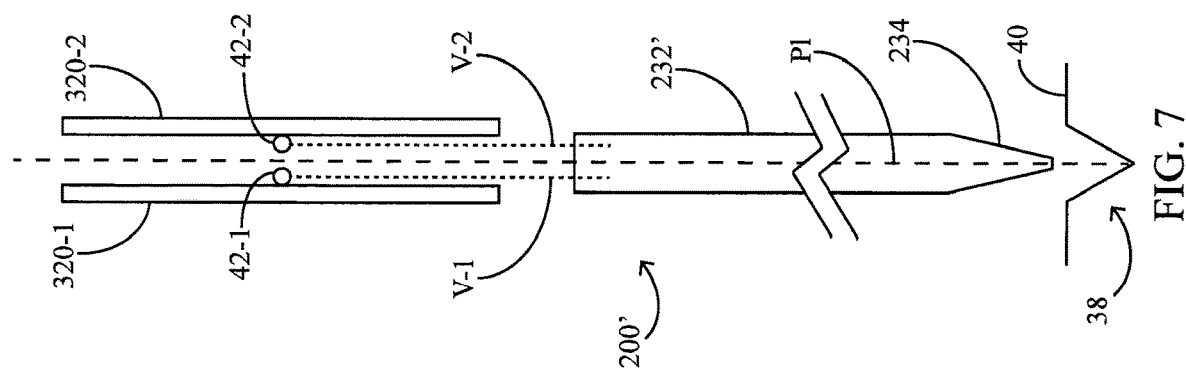

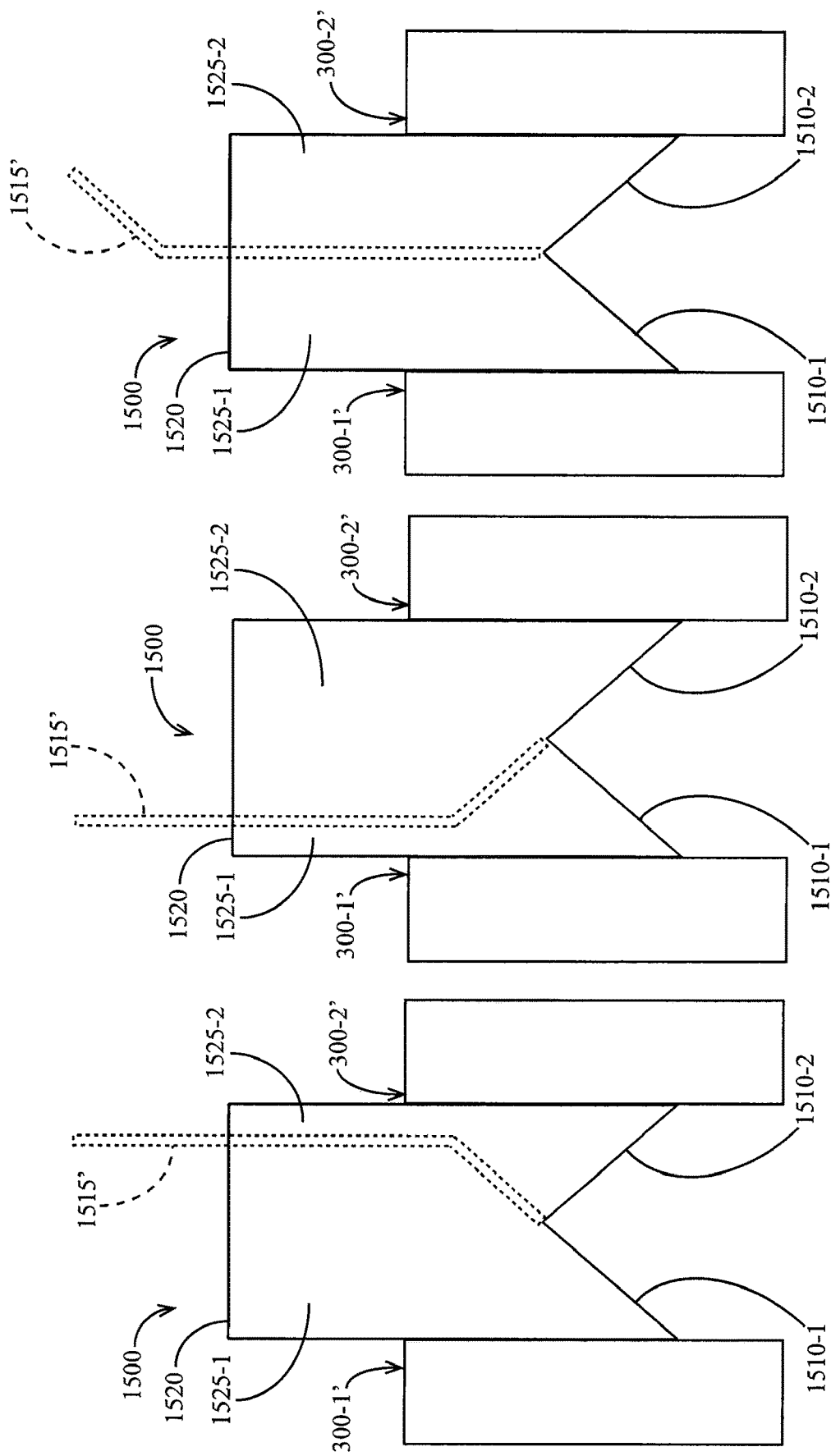

CROP INPUT VARIETY SELECTION SYSTEMS, METHODS, AND APPARATUS

BACKGROUND

In recent years, the ability to control crop input applications on a site-specific basis (known as "precision farming") has increased interest in varying input types throughout a field. In particular, advances in seed genetics and agronomic research have increased the need for solutions enabling the variation of seed types in the field during a planting operation. Some proposed solutions involve shifting between input types fed to the metering units, which may result in blending of input types at the metering units and thus blended input regions in the field. Preferred solutions would quickly transition between input types with limited blending between seed types.

Thus there is a need in the art for systems, methods and apparatus for effectively selecting and varying agricultural input types during an in-field operation.

BRIEF DESCRIPTION OF THE DRAWINGS

FIG. 7 is a rear elevation view of certain components of another embodiment of a planter row unit.

FIG. 8 is a plan view of certain components of the row unit of FIG. 7.

FIG. 9 is a side elevation view of certain components of the row unit of FIG. 7.

FIG. 16C is a rear elevation view of the seed hopper of FIG. 16A including a divider in a third position.

FIG. 16D is a rear elevation view of the seed hopper of FIG. 16A including a divider in a fourth position.

FIG. 16E is a rear elevation view of the seed hopper of FIG. 16A including a divider in a fourth position.

DESCRIPTION

Variety Selection Systems and Apparatus

Figure 1:
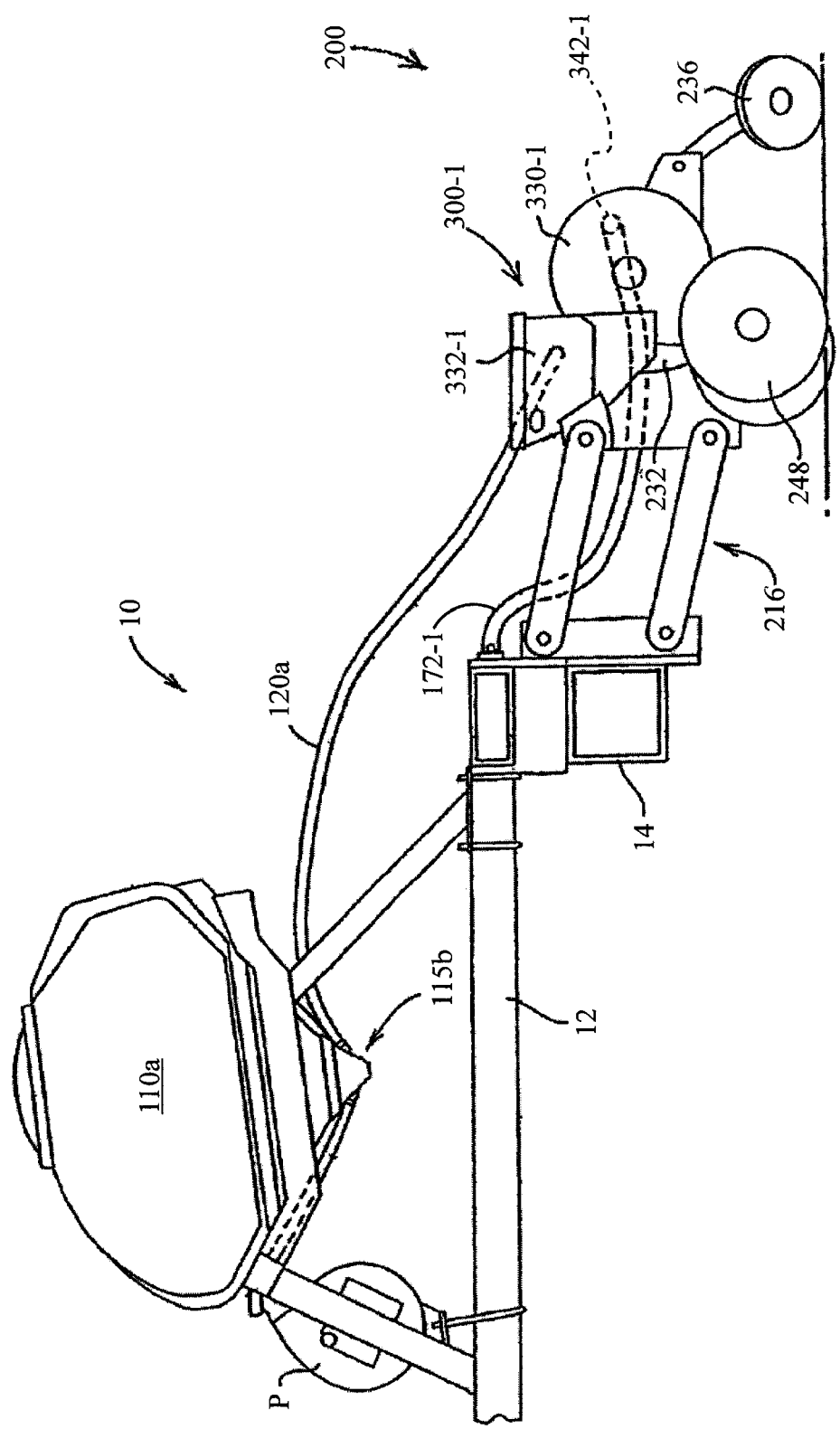
FIG. 1 is a side elevation view of an embodiment of a row crop planter.

Referring now to the drawings, wherein like reference numerals designate identical or corresponding parts throughout the several views, FIG. 1 illustrates a planter 10 having a frame 12 including a transversely extending toolbar 14. A plurality of row units 200 are mounted to the toolbar 14 in transversely spaced relation. A plurality of bulk hoppers 110 are preferably supported by the frame 14 and in seed and pneumatic communication with the row units 200.

Figure 2:
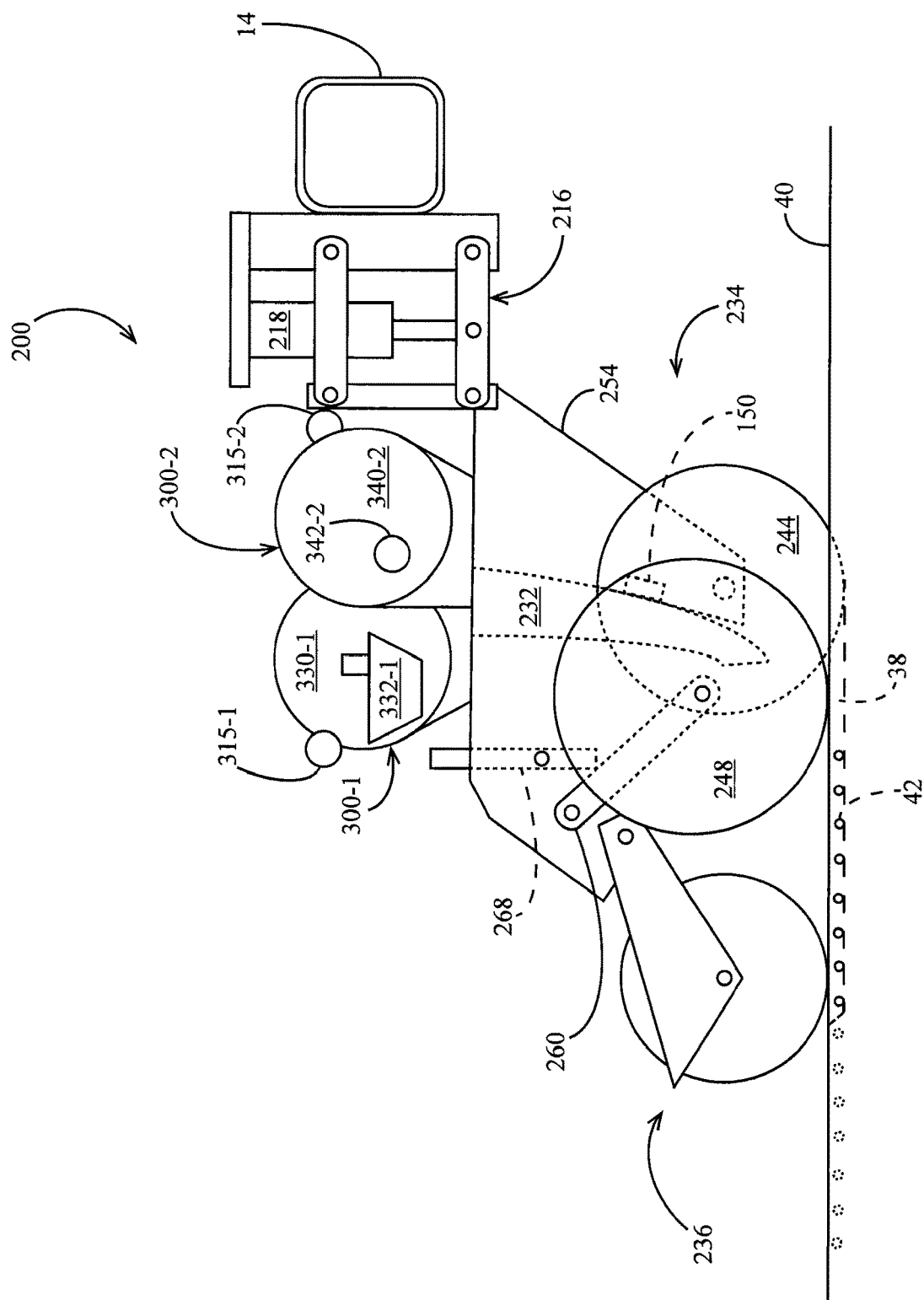
FIG. 2 is a side elevation view of an embodiment of a planter row unit.

Turing to FIG. 2, an embodiment is illustrated in which the row unit 200 is a planter row unit. The row unit 200 is preferably pivotally connected to the toolbar 14 by a parallel linkage 216. An actuator 218 is preferably disposed to apply lift and/or downforce on the row unit 200. A solenoid valve (not shown) is preferably in fluid communication with the actuator 218 for modifying the lift and/or downforce applied by the actuator. An opening system 234 preferably includes two opening discs 244 rollingly mounted to a downwardly-extending shank 254 and disposed to open a v-shaped trench 38 in the soil 40. A pair of gauge wheels 248 is pivotally supported by a pair of corresponding gauge wheel arms 260; the height of the gauge wheels 248 relative to the opener discs 244 sets the depth of the trench 38. A depth adjustment rocker 268 limits the upward travel of the gauge wheel arms 260 and thus the upward travel of the gauge wheels 248. A downforce sensor (not shown) is preferably configured to generate a signal related to the amount of force imposed by the gauge wheels 248 on the soil 40; in some embodiments the downforce sensor comprises an instrumented pin about which the rocker 268 is pivotally coupled to the row unit 200, such as those instrumented pins disclosed in Applicant's co-pending U.S. patent application Ser. No. 12/522,253 (Pub. No. US 2010/0180695), the disclosure of which is hereby incorporated herein by reference.

Continuing to refer to FIG. 2, a first seed meter 300-1 such as that disclosed in Applicant's co-pending International Patent Application No. PCT/US2012/030192 ("the '192 application"), the disclosure of which is hereby incorporated herein by reference, is preferably mounted to the row unit 200 and disposed to deposit seeds 42 into the trench 38, e.g., through a seed tube 232 disposed to guide the seeds toward the trench. In other embodiments, the seed tube 232 is replaced with a seed conveyor such as that disclosed in Applicant's co-pending International Patent Application No. PCT/US2012/057327 ("the '327 application"), incorporated herein by reference. A second seed meter 300-2 such as that disclosed in the '192 application is preferably mounted to the row unit 200 and disposed to deposit seeds 42 into the same trench 38, e.g., through the same seed tube 232. In embodiments in which the seed tube is replaced with a seed conveyor, the seed meters 300-1, 300-2 supply seed into the same seed conveyor; in embodiments in which the seed conveyor includes a loading wheel for urging seed into the seed conveyor, the seed conveyor is preferably configured to alternately urge seeds from the seed meter 300-1 and the seed meter 300-2 into the seed conveyor.

Continuing to refer to FIG. 2, each of the seed meters 300-1, 300-2 preferably includes a seed side housing 330 having an auxiliary hopper 332 for storing seeds 42 to be deposited by the meter. Each of the seed meters 300-1, 300-2 preferably includes a vacuum side housing 340 including a vacuum port 342 for pulling a vacuum within the vacuum side housing. Each of the seed meters 300-1, 300-2 preferably includes a seed disc 320 including a plurality of seed apertures 322 (see FIG. 6); the seed disc 320 preferably separates interior volumes of the vacuum side housing 340 and the seed side housing 330. In operation, seeds 42 communicated from the auxiliary hopper 332 into the seed side housing 330 are captured on the seed apertures 322 due to the vacuum in the vacuum side housing and then released into the seed tube 232. Each of the meters is preferably powered by individual electric drives 315-1, 315-2 respectively. Each drive 315 is preferably configured to drive a seed disc 320 within the associated seed meter 300. Each electric drive 315 preferably comprises an electric drive such as one of the embodiments disclosed in International Patent Application No. PCT/US2013/051971 and/or U.S. Pat. No. 7,617,785, the disclosures of both of which are hereby incorporated herein in their entirety by reference. In other embodiments, the drive 315 may be replaced with a hydraulic drive or other motor configured to drive the seed disc.

Figure 27:
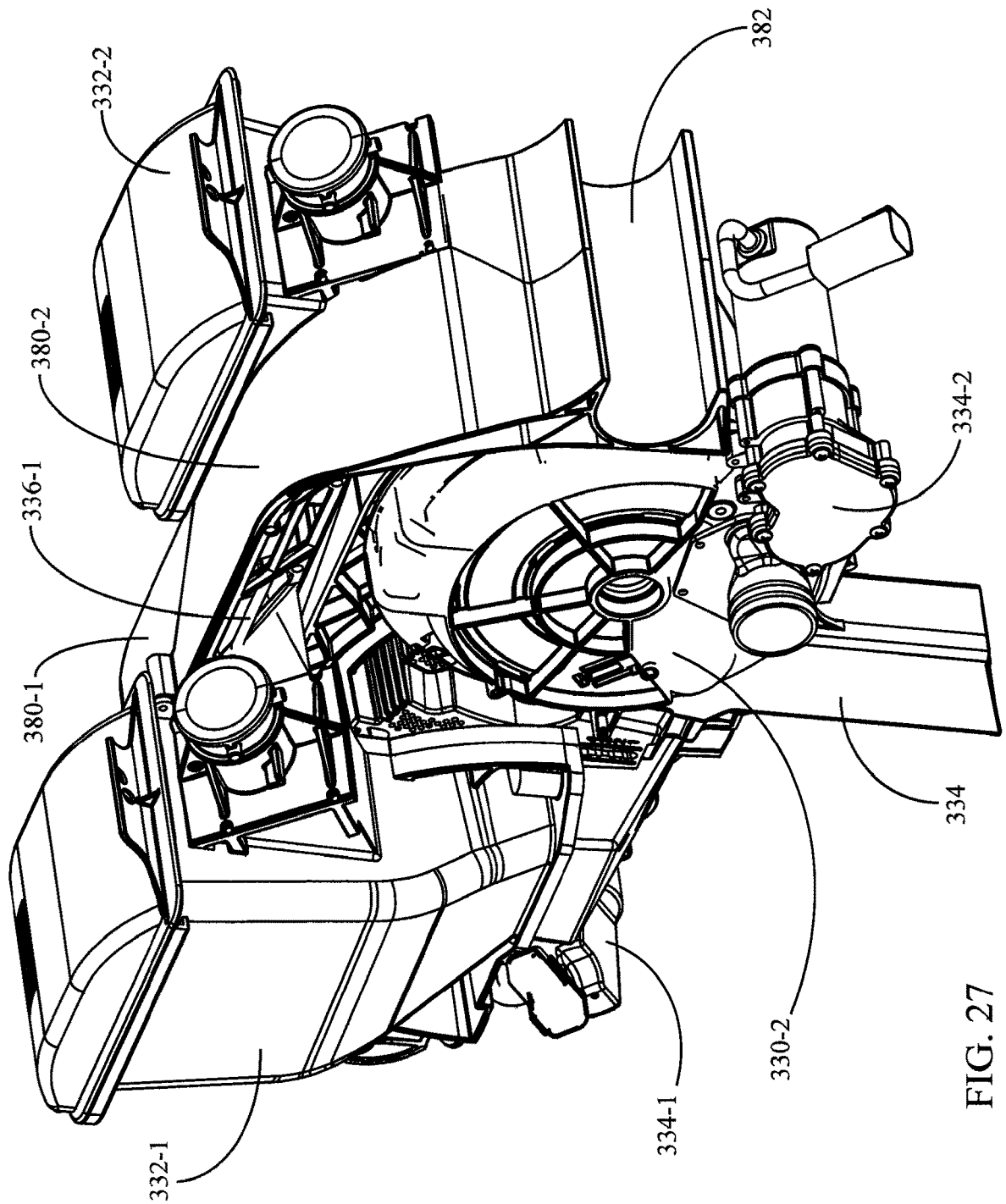
FIG. 27 is a left front perspective view of the two seed meters of FIG. 26.
Figure 28:
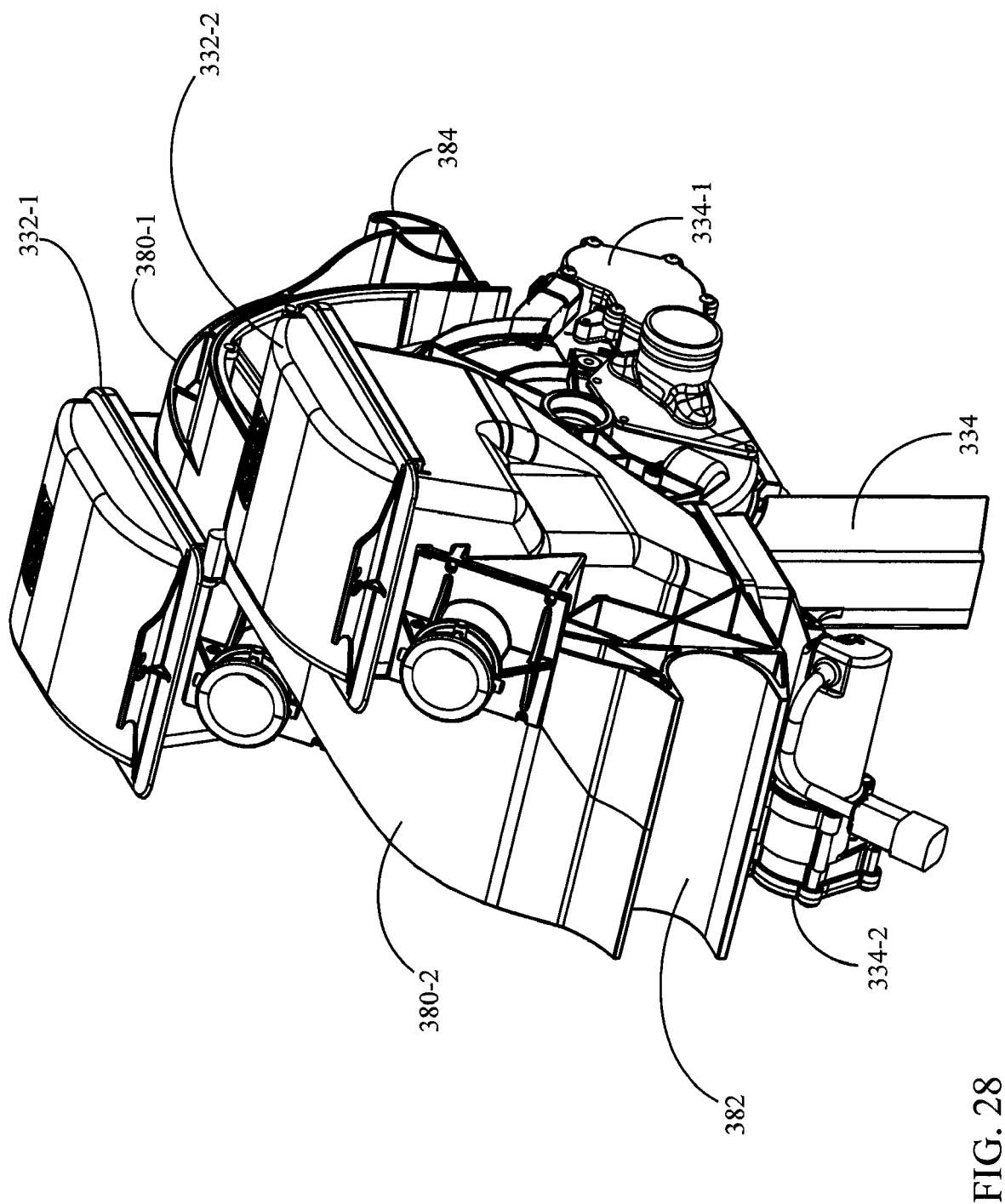
FIG. 28 is a right front perspective view of the two seed meters of FIG. 26.
Figure 29:
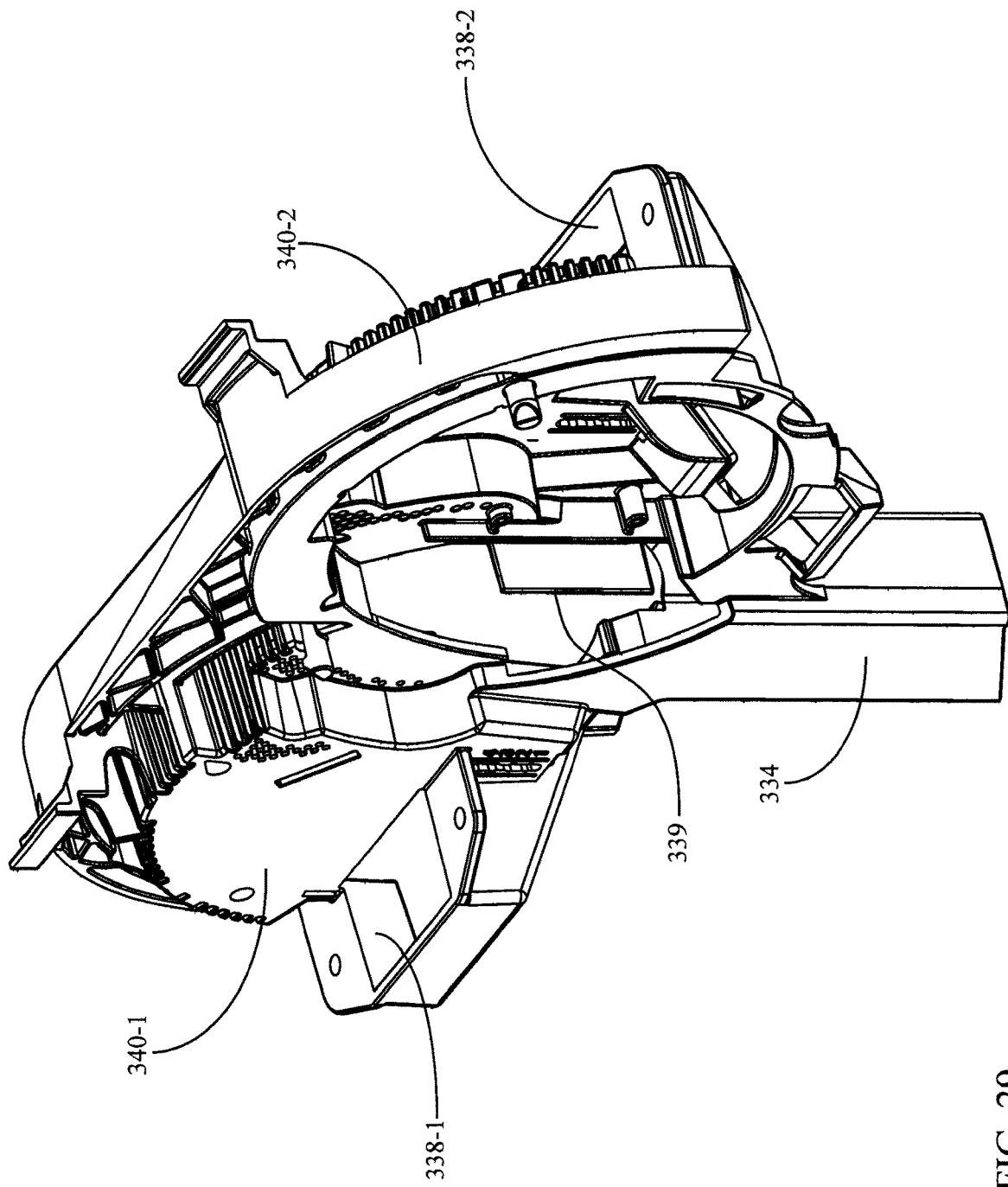
FIG. 29 is a left front perspective view of the seed side housings of the two seed meters of FIG. 26.
Figure 30:
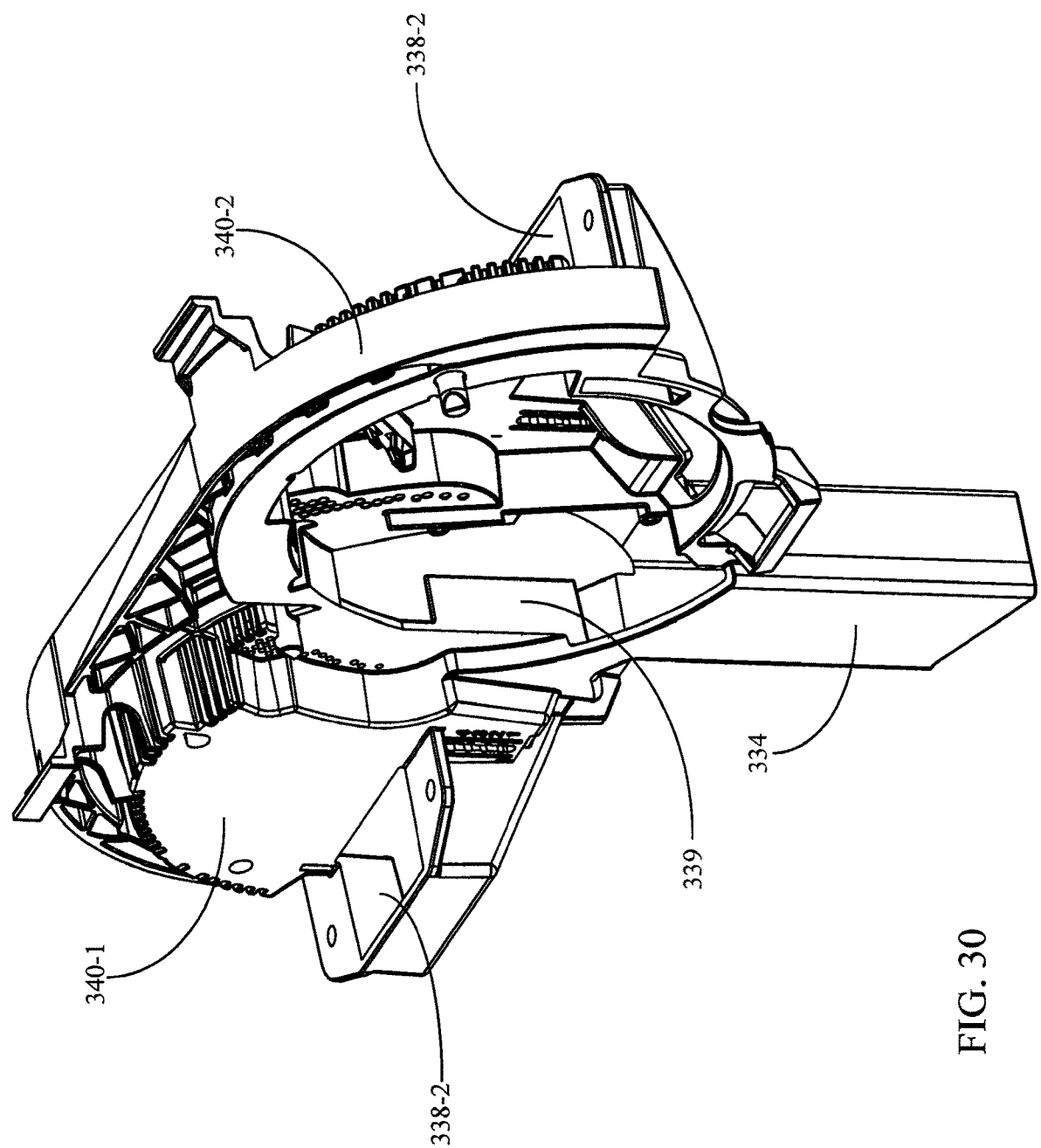
FIG. 30 is a left rear perspective view of the seed side housings of the two seed meters of FIG. 26.

An embodiment of the seed meters 300-1, 300-2 is illustrated in detail in FIGS. 26-30. Referring to FIGS. 29-30, the seed meters 300-1, 300-2 are preferably joined together. The seed side housings 330-1, 330-2 preferably comprises a unitary part including an exit chute 334 disposed to receive seeds released by both seed meters 300. The seed sides housings are preferably disposed such that seeds released from the seed discs in both meters 300 (e.g., at the 3 o'clock position) fall into the exit chute 334. Although in normal operation, seeds should simply free-fall from the 3 o'clock position of the seed disc into the exit chute 224, a guide surface 339 is preferably disposed to constrain seeds deposited by the seed meter 300-2 to fall down the exit chute if the seed meter 300-2 releases seeds before or after the 3 o'clock position. The exit chute 334 is preferably mounted to an upper end of the seed tube 232 such that the exit chute 334 communicates seeds from both seed meters 300 to the seed tube 232.

Figure 26:
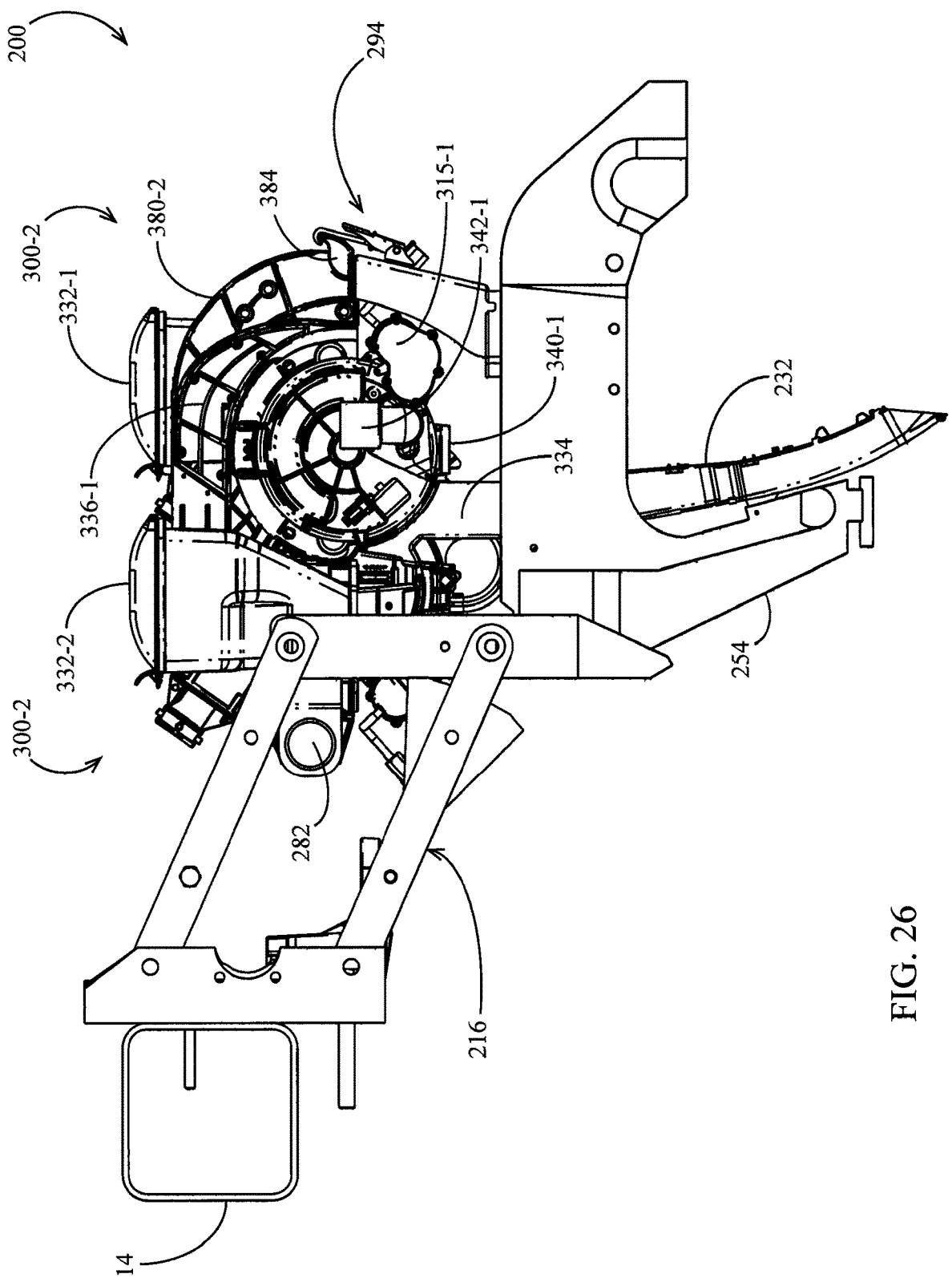
FIG. 26 is a side elevation view of an embodiment of a row unit including two seed meters.

Each of the seed side housings 330 preferably includes an opening 338 in communication with an auxiliary hopper 332. Referring to FIGS. 27-28, a shield 380 is preferably mounted to each seed meter 300. Each shield 380 preferably includes a vent 336 in fluid communication with an interior volume of the seed side housing 330. A screen (not shown) is preferably mounted to the vent 336 to prevent small particles or debris from entering the vent 336. The shield 380 is preferably disposed to shield the vent 336 from rain. The shield 380-2 preferably includes a mounting receptacle 382. The shield 380-1 preferably includes a mounting hook 384. Referring to FIG. 26, the row unit 200 preferably includes a mounting bar 282 configured to rotatably engage the mounting receptacle 382. The row unit 294 preferably includes a latch configured to selectively engage the mounting hook 384. In an installation phase, the operator preferably engages the mounting receptacle 382 to the mounting bar 282 and rotates the meters 300 downward (clockwise on the view of FIG. 26) until the exit chute 334 engages the seed tube 232. The operator then secures the mounting hook 384 to the row unit 200 using the latch 294. Thus mounting bar 282 and the latch 292 cooperate to selectively retain the seed meters 300 in engagement with the row unit 200 and in communication with the seed tube 232.

A seed sensor 150 (e.g., an optical or electromagnetic seed sensor configured to generate a signal indicating passage of a seed) is preferably mounted to the seed tube 232 and disposed to send light or electromagnetic waves across the path of seeds 42. A closing system 236 including one or more closing wheels is pivotally coupled to the row unit 200 and configured to close the trench 38.

Figure 3:
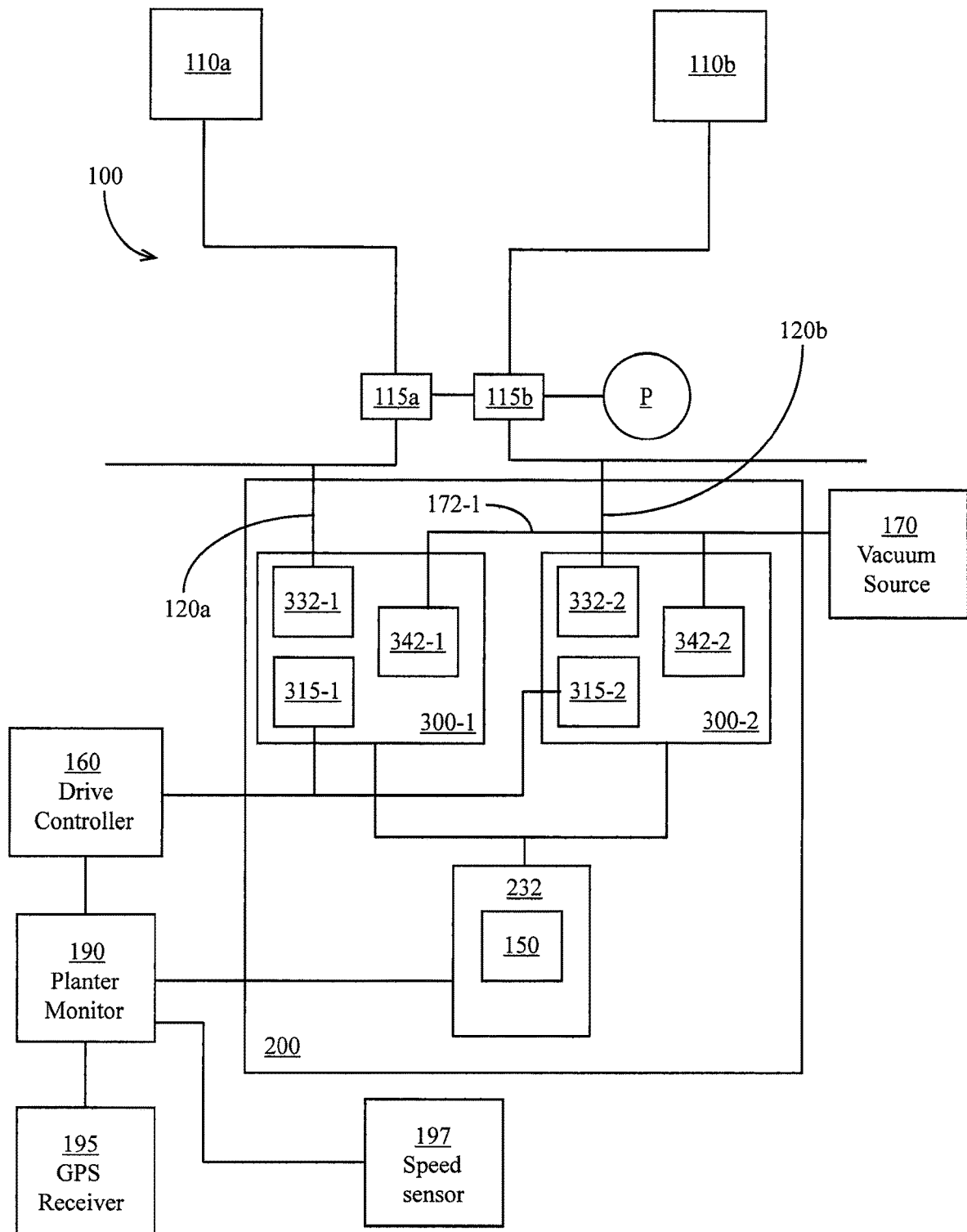
FIG. 3 schematically illustrates an embodiment of a seed variety selection system.

Turning to FIG. 3, a seed variety selection system 100 is illustrated. The system 100 preferably includes a plurality of bulk hoppers 110 (e.g., two bulk hoppers 110a and 110b as illustrated). The first bulk hopper 110a preferably contains a first seed variety (e.g., a first corn seed variety or a first soybean variety); the second bulk hopper 110b preferably contains a second seed variety (e.g., a second corn seed variety or a second soybean variety). Each bulk hopper is preferably in fluid communication with an individual seed entrainer 115. Each seed entrainer 115 is preferably mounted to a lower outlet of the associated bulk hopper 110. Each seed entrainer 115 is preferably in fluid communication with a pneumatic pressure source P and configured to convey air-entrained seeds through a plurality of seed lines 120 to the row units 200. Via a plurality of seed lines 120a, the bulk hopper 110a and the entrainer 115a are preferably in seed communication with a first seed meter 300-1 (e.g., with the auxiliary hopper 332-1) of each row unit 200 along the toolbar 14. In operation, the bulk hopper 110a supplies the first seed variety to the first meter 300-1 of each row unit 200. Via a plurality of seed lines 120b, the bulk hopper 110b and the entrainer 115b are preferably in seed communication with a second seed meter 300-2 (e.g., with the auxiliary hopper 332-2) of each row unit 200 along the toolbar 14. In operation, the bulk hopper 110b supplies the second seed variety to the second meter 300-2 of each row unit 200.

Continuing to refer to FIG. 3, each drive 315-1, 315-2 is preferably in data communication with a drive controller 160. The drive controller is preferably configured to generate a drive command signal corresponding to a desired rate of seed disc rotation. The drive controller 160 is preferably in data communication with a planter monitor 190. The planter monitor 190 preferably includes a memory, a processor, and a user interface. The planter monitor is preferably configured to send drive command signals and/or desired rates of seed disc rotation to the drive controller 160. The planter monitor 190 is preferably in data communication with a GPS receiver 195 mounted to either the planter 10 or the tractor used to draw the planter. The planter monitor 190 is preferably in data communication with a speed sensor 197 (e.g., a radar speed sensor) mounted to either the planter 10 or the tractor. As used herein, "data communication" may refer to any of electrical communication, electronic communication, wireless (e.g., radio) communication, or communication by any other medium configured to transmit analog signals or digital data.

Figure 33:
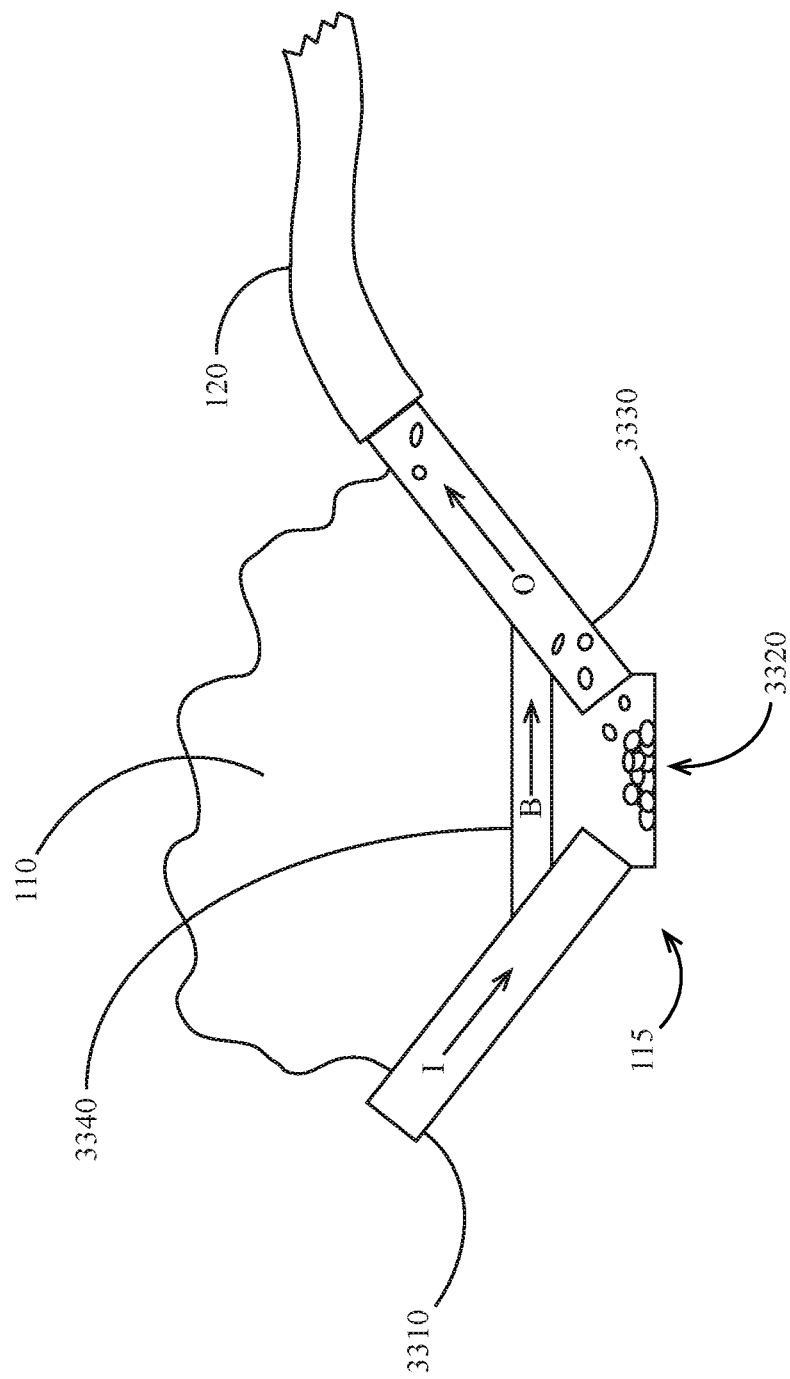
FIG. 33 is a side cutaway view of an embodiment of an embodiment of an entrainer having a bypass channel.

Turning to FIG. 33, an embodiment of the entrainer 115 is illustrated in detail. Air from the pressure source P enters an inlet 3310; air in the inlet 3310 generally has a velocity vector I. Air from the inlet 3310 preferably enters a lower portion of the bulk hopper 110 adjacent to a location where a quantity 3320 of seed accumulates by gravity. The air entrains seeds into an outlet 3330; air in the outlet 3330 generally has a velocity vector O. Seed preferably passes from the outlet 3330 to one of the row units 200 via one of the seed lines 120. The entrainer 115 preferably includes a bypass channel 3340 extending between the inlet 3310 and the outlet 3330. The bypass channel 3340 is preferably disposed inside the bulk hopper 110. The bypass channel 3340 is preferably enclosed from the interior volume of the bulk hopper 110 such that air flows through the bypass channel without obstruction by seeds. Bypass air moving from the inlet 3310 to the outlet 3330 via the bypass channel 3340 generally has a velocity vector B. In some embodiments, a valve (e.g., a ball valve) is disposed in the bypass channel 3340 such that the operator may vary an opening through which air is required to flow in order to pass through the bypass channel. In some embodiments a plurality of bypass channels in the entrainer each includes a valve; the plurality of valves is preferably controlled by a single manual actuator (e.g., a lever) or in some embodiments by one or more electrically operated actuators.

In some embodiments, a drive controller 160 associated with each row unit 200 is configured to receive signals from the planter monitor 190 via a bus (e.g., a CAN bus) and to receive motor encoder signals from and send drive command signals to each of the drives 315-1, 315-2 (e.g., via point-to-point electrical connections). In other embodiments, a separate drive controller 160 is associated with each drive 315.

Figure 21:
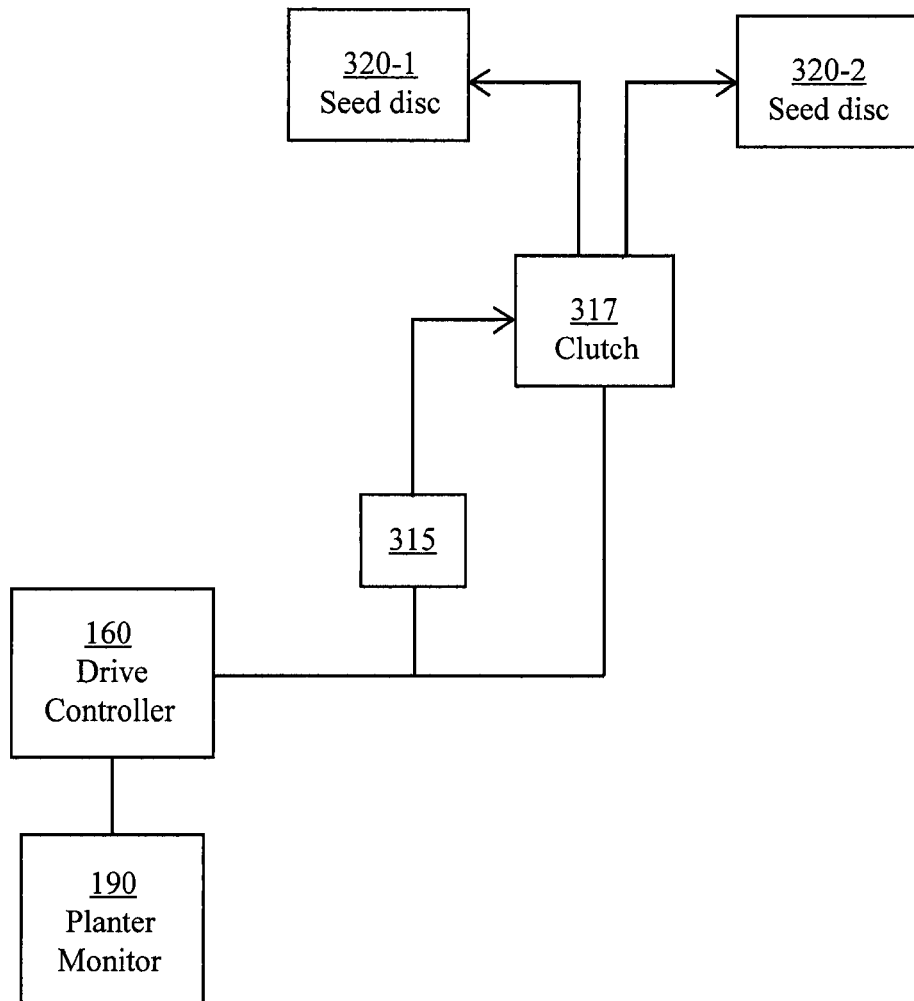
FIG. 21 schematically illustrates an embodiment of a system for selectively driving one of two seed discs via a clutch.

In still other embodiments as illustrated in FIG. 21, a single drive 315 is configured to alternately drive either of the seed discs 320-1, 320-2 via a clutch 317 configured to place an output shaft of the motor in operative connection with one or the other of the seed discs 320-1, 320-2. The clutch is preferably configured to alternate the operative connection of the drive 315 from one seed disc in response to a clutch command signal. As an illustrative example, the clutch 317 may shift an idler gear between a first and a second position; in the first position the idler gear operably connects the drive 315 to the first seed disc 320-1 for driving the seed disc 320-1, and in the second position the idler gear operably connects the drive 315 to the second seed disc 320-2 for driving the seed disc 320-2. The drive controller 160 is preferably in data communication with the clutch 317 for sending clutch command signals to the clutch. The drive controller 160 is preferably configured to receive signals from the planter monitor 190 via a bus (e.g., a CAN bus) and to receive motor encoder signals from and send drive command signals to the single drive 315 (e.g., via point-to-point electrical connections).

Continuing to refer to FIG. 3, each vacuum port 342 is preferably in fluid communication with a vacuum source 170 via a vacuum line 172. In some embodiments, the vacuum source 170 comprises a vacuum tube having outlets corresponding to the vacuum ports 342. In order to reduce loss of vacuum, at least some of the outlets are preferably disposed at an angle less than 90 degrees relative to the vacuum tube; e.g., angled 45 degrees in an outboard direction. The outlets may additionally define a curvilinear flow pattern having an acute outlet angle at the interface between the vacuum tube and each outlet.

Figure 25A:
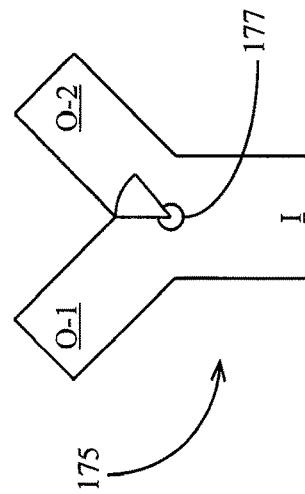
FIG. 25A is a sectional view of an embodiment of a solenoid-operated valve having a baffle in a first position.
Figure 25B:
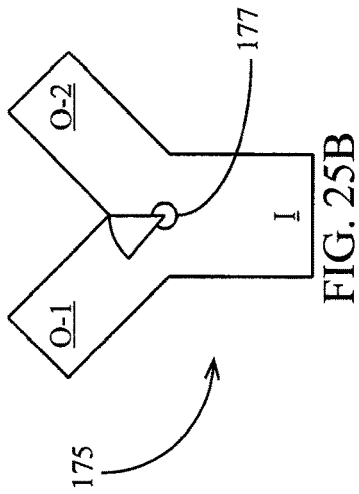
FIG. 25B is a sectional view of the valve of FIG. 25A having a baffle in a second position.
Figure 25C:
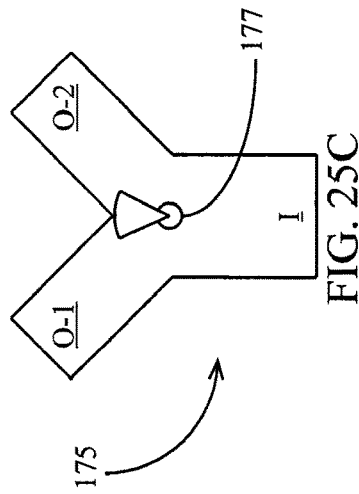
FIG. 25C is a sectional view of the valve of FIG. 25A having a baffle in a third position.
Figure 24:
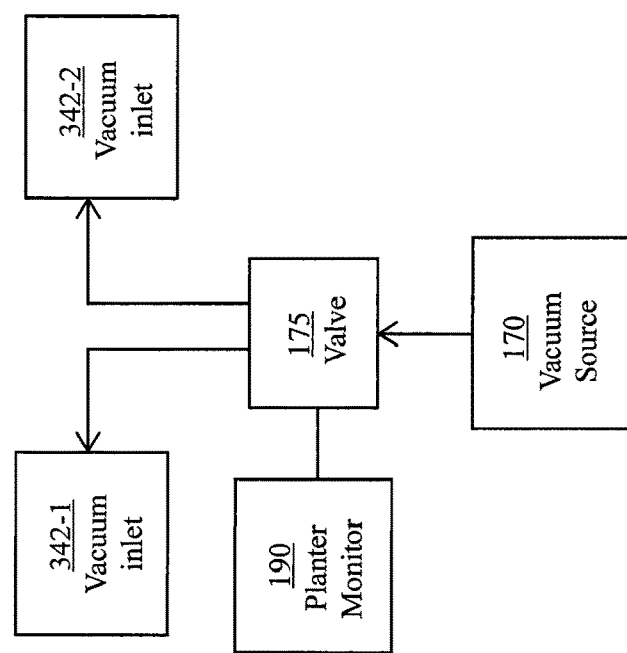
FIG. 24 schematically illustrates an embodiment of a system for supplying vacuum to two seed meters via a valve.

Referring to FIGS. 24-25C, in some embodiments the vacuum source 170 is in fluid communication with each pair of vacuum ports 342 via a solenoid-operated valve 175. In the embodiment of the solenoid-operated valve 175 illustrated in FIGS. 25A-25C, the solenoid-operated valve includes an vacuum inlet I in fluid communication with the vacuum source 170, two vacuum outlets O-1, O-2 in fluid communication with the vacuum ports 342-1, 342-2, respectively, and a baffle 177 selectively moveable between three positions in response to a control signal received from the planter monitor 190, which is preferably in data communication with the solenoid-operated valve. In the first position illustrated in FIG. 25A, the baffle 177 partially blocks flow to the second vacuum port 342-2, establishing only the vacuum level in meter 300-2 necessary to retain seeds on the seed disc 320-2 (e.g., 10 inches of water), and leaving the first outlet O-1 substantially open. In the second position illustrated in FIG. 25B, the baffle 177 partially blocks flow to the first vacuum port 342-1, establishing only the vacuum level in meter 300-1 necessary to retain seeds on the seed disc 320-1 (e.g., 10 inches of water), and leaving the second outlet O-2 substantially open. In the third position illustrated in FIG. 25C, the baffle 177 preferably leaves both outlets O-1, O-2 substantially open. In operation, the planter monitor 190 preferably commands the valve 175 to shift to the first position when only the first meter 300-1 is planting (e.g., when only the drive 315-1 is commanded to drive), commands the valve 175 to shift to the second position when only the first meter 300-2 is planting (e.g., when only the drive 315-2 is commanded to drive), and commands the valve 175 to shift to the third position when both meters 300 are planting (e.g., when both drives 315 are commanded to drive).

Continuing to refer to FIG. 3, both the first seed meter 300-1 and the second seed meter 300-2 of each row unit 200 are preferably in seed communication with (e.g., disposed to deposit seed into) a seed tube 232 associated with the row unit 200. The seed sensor 150 associated with the seed tube 232 of each row unit 200 is preferably in data communication with the planter monitor 190.

In other embodiments of the variety selection system 100, a third bulk hopper is in fluid and seed communication with the second seed meter 300-2 on all or a subset of the row units 200. In such embodiments, the third bulk hopper may be filled with refuge seed. In still other embodiments, the third bulk hopper may be filled with another granular input such as granular fertilizer. In some embodiments, the third bulk hopper is in fluid and seed communication with a third seed meter on all or a subset of the row units 200, the third seed meter preferably disposed to deposit seed into the same seed tube 232 as the first and second meters 320-1, 320-2.

In some embodiments a third seed meter 320-3 is disposed above the second meter 320-2 as illustrated in FIGS. 28A and 28B and preferably disposed to release seeds into the same seed tube 232, preferably along the same transverse plane Pt, and preferably along the same longitudinal plane P1. The third seed meter 320-3 preferably rotates in a direction R-3 equivalent to the direction R-1. In the embodiment of FIG. 28A, an auxiliary seed tube 392 is disposed to guide seeds from the third meter 320-3 toward the seed tube 232; as illustrated, the auxiliary seed tube is disposed below the seed release point of the third meter 320-3 and above the seed tube 232 and arranged vertically between the seed release point of the third seed meter 320-3 and the seed release point of the seed meters 320-1, 320-2. In the embodiment of FIG. 28B, a flighted belt 394 is disposed to guide seeds from the third meter 320-3 toward the seed tube 232; as illustrated, the flighted belt is disposed to receive seeds released from the third meter 320-2 the release seeds at a point vertically above the seed tube 232. A backing wall 396 is preferably disposed to retain seeds on the flighted belt 395 during vertical travel prior to release.

Figure 6:
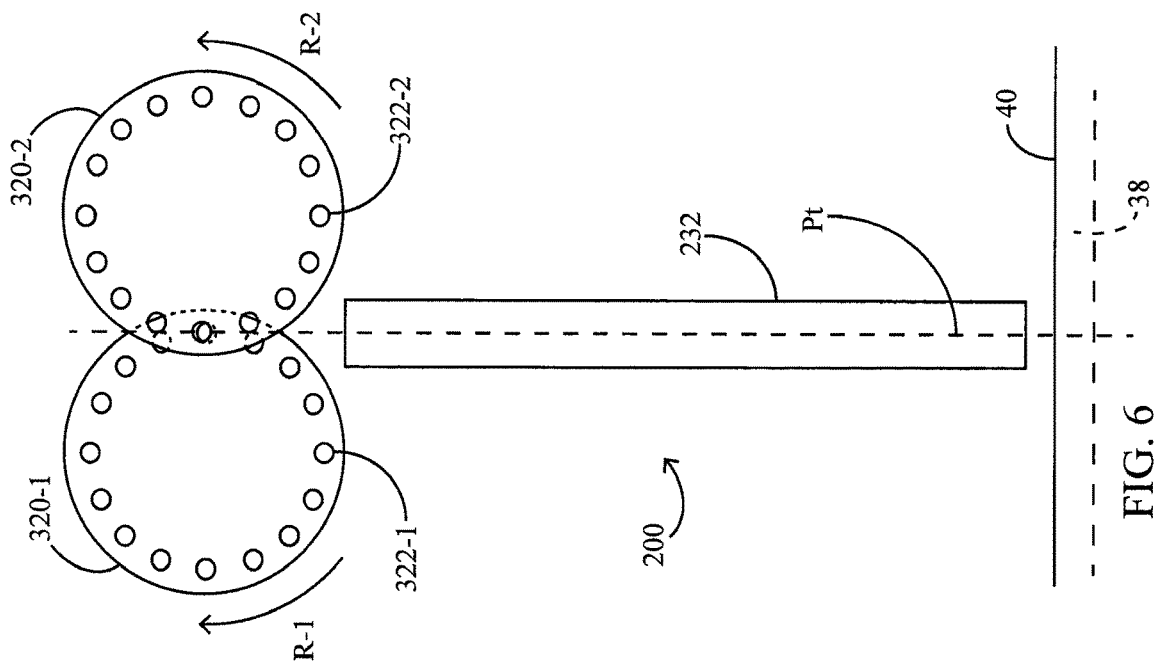
FIG. 6 is a side elevation view of certain components of the row unit of FIG. 2.
Figure 5:
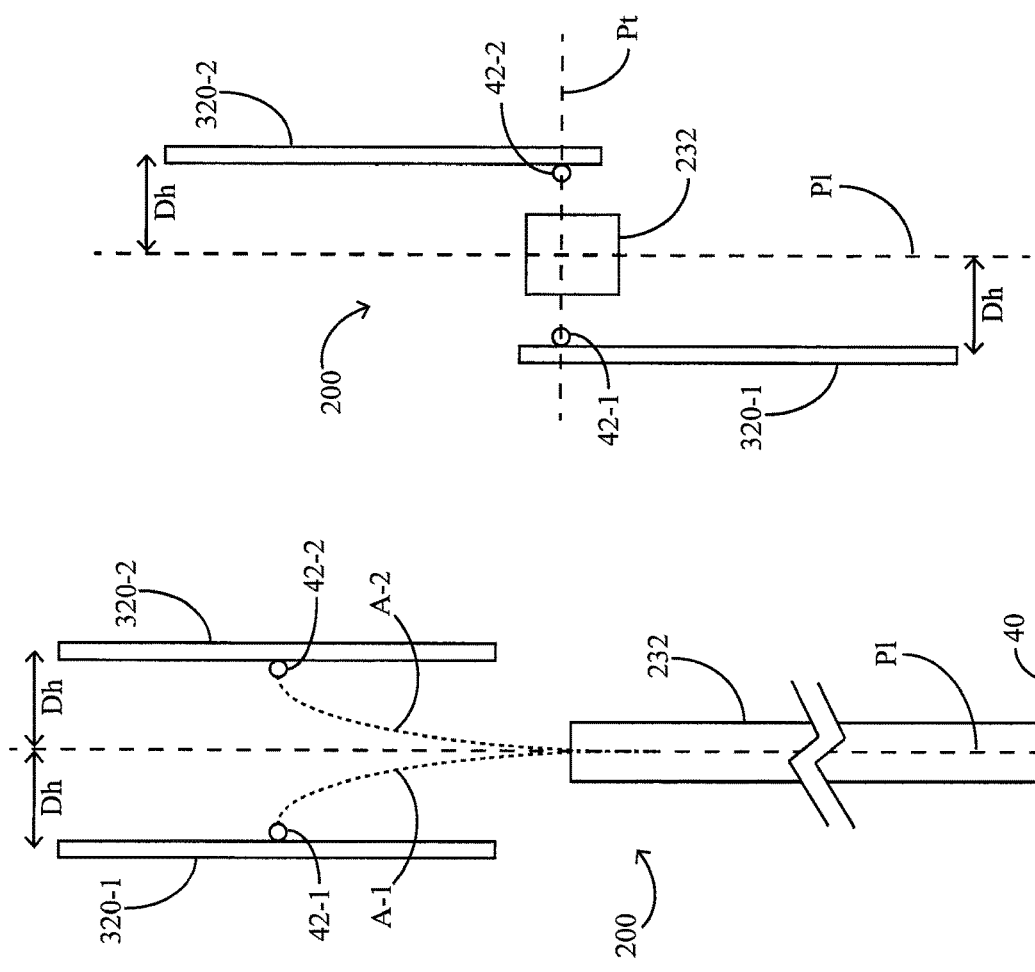
FIG. 5 is a plan view of certain components of the row unit of FIG. 2.
Figure 4:
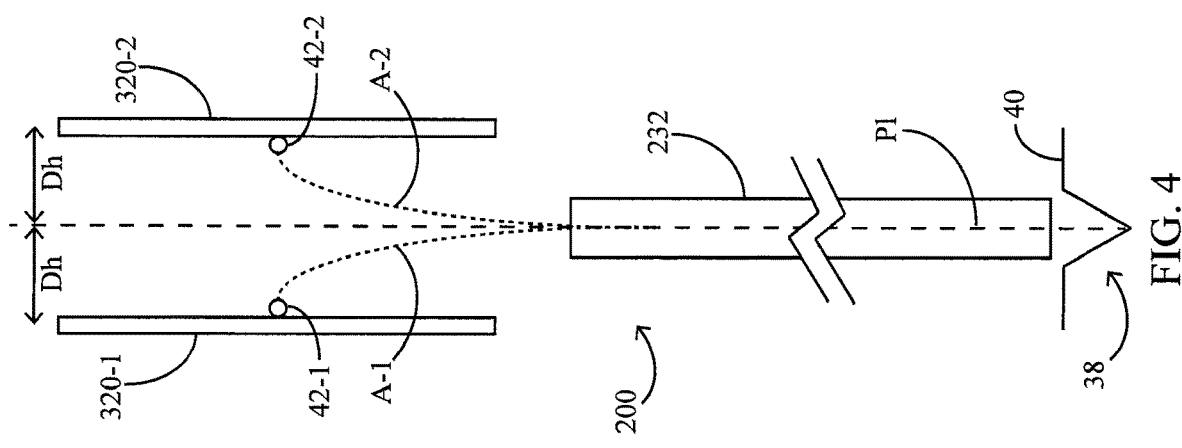
FIG. 4 is a rear elevation view of certain components of the row unit of FIG. 2.

An embodiment of the row unit 200 is illustrated in FIGS. 4-6. The seed discs 320-1, 320-2 (of the seed meters 300-1, 300-2, respectively) are disposed at a lateral offset Dh from a central vertical plane P1 of the seed tube 232. The meters 300 preferably release seeds 42 at approximately the 3 o'clock position (along the view of seed disc 320-1 in FIG. 6) of the seed disc, e.g., by vacuum cutoff as is known in the art. The central rotational axes of the seed meters 320-1, 320-2 are preferably offset longitudinally rearward and forward, respectively, of a transverse plane Pt intersecting an inlet of the seed tube 232 such that seeds are released into the seed tube. As illustrated in FIG. 6, the seed discs 320-1, 320-2 preferably rotate in opposite directions R-1, R-2, respectively, in operation of the seed meters 300. The seed discs 320-1, 320-2 preferably release seeds 42 along arcuate paths A-1, A-2 respectively such that each seed travels laterally inboard of the associated seed disc as the seed falls from the disc. It should be appreciated that such arcuate release of seeds may be effected by one or more features of the seed disc; for example, the seed apertures 322 are preferably chamfered such that the seeds are released along an angled surface. The offset Dh is preferably selected such that the seeds 42 released from both seed discs 320 fall into the seed tube 232, preferably adjacent to the plane P1. The offset Dh is preferably between 0.1 and 0.75 inches and is preferably about 0.5 inches. Because the seed tube 232 is preferably in substantial alignment with the trench 38, such release of seeds into the transverse center of the seed tube 232 ensures that the seed tube 232 deposits seeds into the transverse center of the trench 38 formed by the row unit 200. Thus the seed meters 300 mounted to the row unit 200 are configured and disposed to release seeds into the transverse center of the trench 38 opened by the row unit 200.

A second embodiment of the row unit 200' is illustrated in FIGS. 7-9. In the second embodiment, seeds 42 are released from the seed discs 320-1, 320-2 along substantially vertical paths V-1 and V-2, respectively. Seeds 42 enter the upper inlet of a modified seed tube 232' at positions transversely spaced from the seed tube, e.g., transversely spaced from the plane P1. The modified seed tube 232' preferably includes a guide surface 234 configured to guide the seeds from their transversely spaced entry points at the upper inlet of the seed tube to the plane P1 prior to release from the seed tube. The lateral offset Dh of the seed discs 320 is preferably smaller in the second embodiment, e.g., between 0 and 0.5 inches. In some embodiments, the longitudinal offsets of the central rotational axes of the seed discs 320 from the plane Pt are different such that seeds are released from the discs 320-1, 320-2 rearward and forward, respectively, of the plane Pt. In such embodiments, the variation in longitudinal offset is preferably selected such that the seed discs and seeds do not interfere with one another and such that seeds are released into the upper inlet of the seed tube 232.

Figure 18:
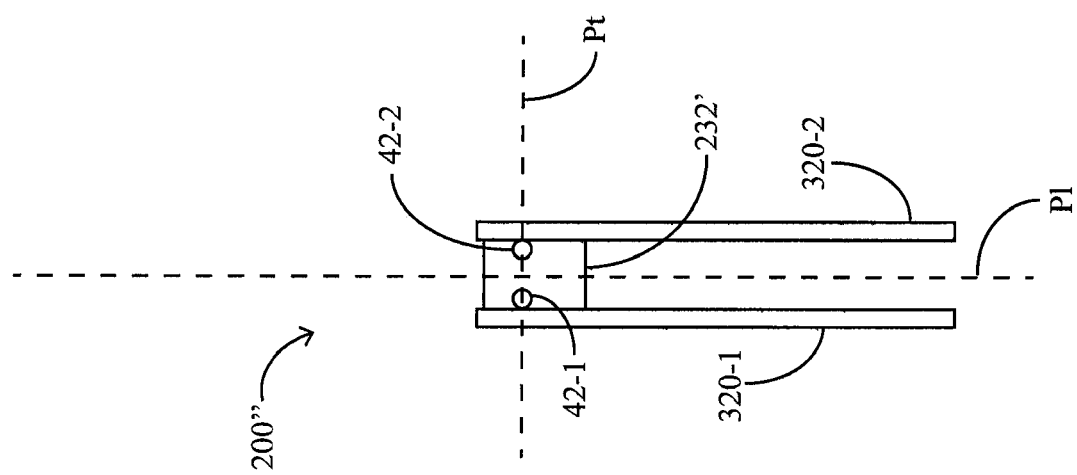
FIG. 18 is a plan view of an embodiment of a row unit having two seed meters.

A third embodiment of the row unit 200" is illustrated in FIG. 18. In the third embodiment, the seed discs 320-1, 320-2 are substantially longitudinally aligned and rotate in the same direction. As with embodiments described above, seeds 42 are released from the seed discs 320 into a common seed tube.

Figure 22:
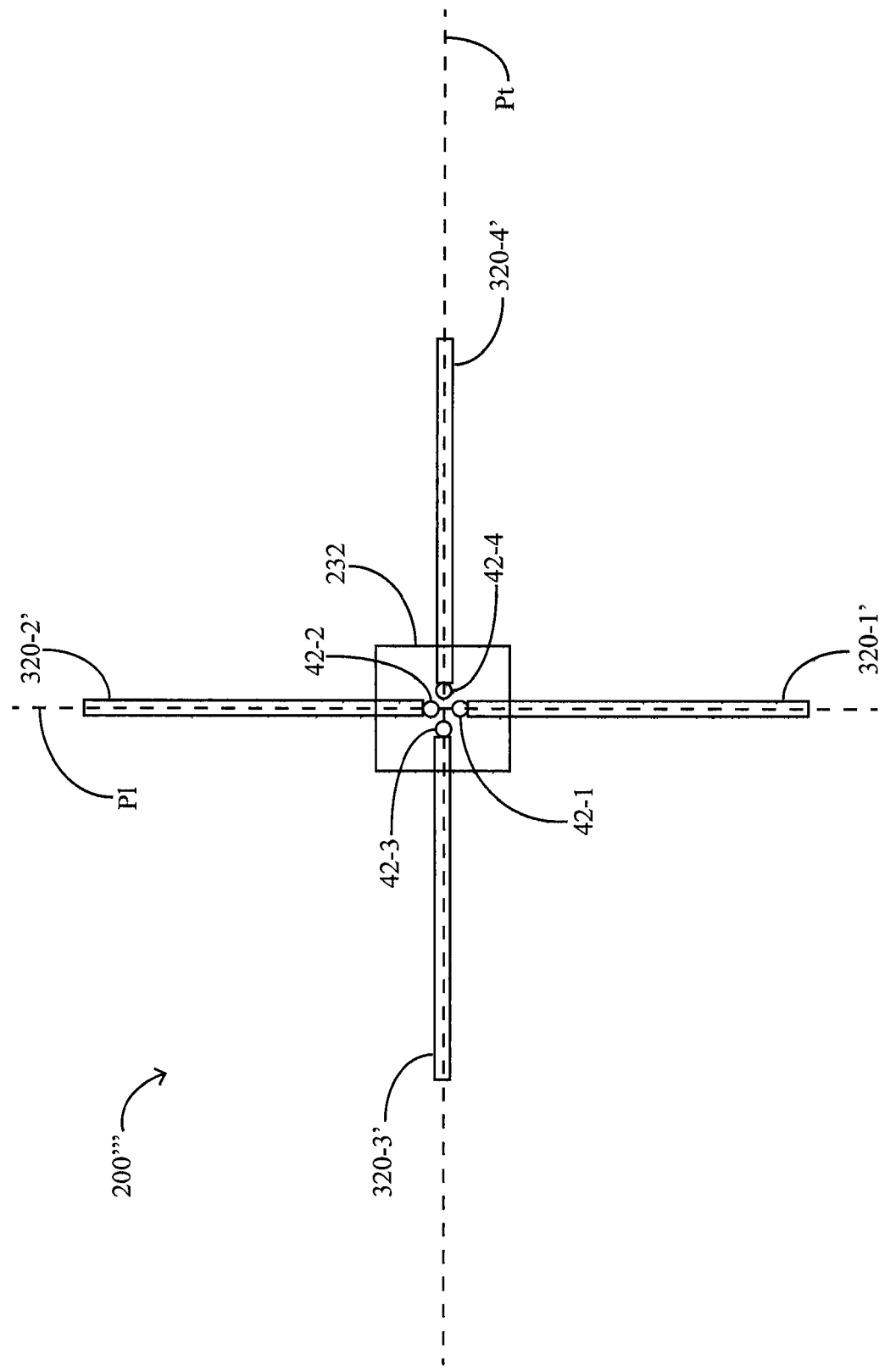
FIG. 22 is a plan view of an embodiment of a row unit including a plurality of edge-release seed discs disposed to deposit seeds into the same seed tube.
Figure 23B:
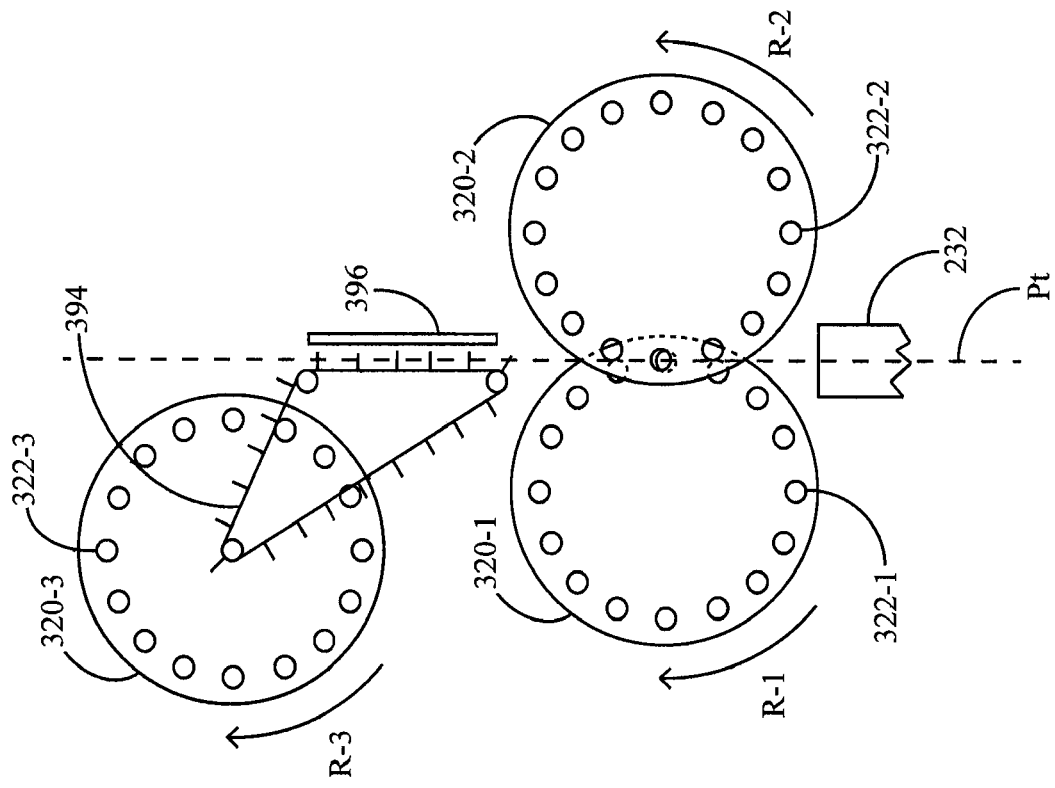
FIG. 23B is a side elevation view of an embodiment of a row unit incorporating three seed meters disposed to deposit seeds into a common seed tube and including a conveyor.
Figure 23A:
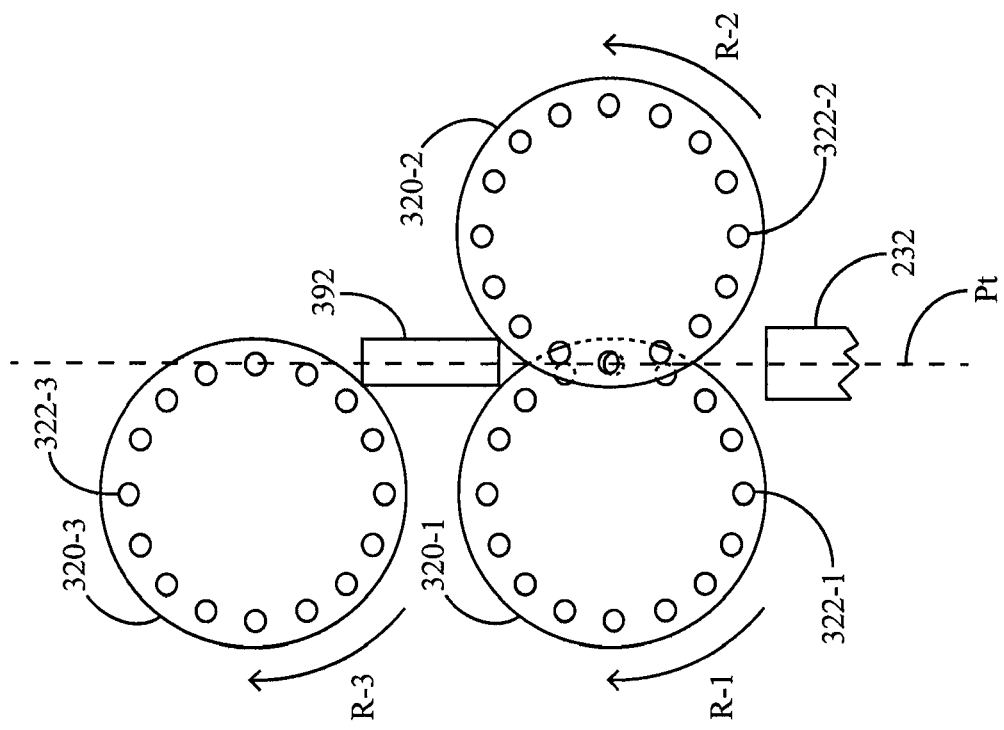
FIG. 23A is a side elevation view of an embodiment of a row unit incorporating three seed meters disposed to deposit seeds into a common seed tube and including an auxiliary seed tube.

A fourth embodiment of the row unit 200'" is illustrated in FIG. 22. In the fourth embodiment, a plurality modified seed discs 320' are configured to capture seeds 42 on and release seeds from a peripheral edge of the seed disc. In such an embodiment, the seed discs preferably comprise one of the seed disc embodiments disclosed in U.S. patent application Ser. No. 12/399,173 and/or U.S. Pat. No. 7,152,542, both of which are incorporated herein by reference. It should be appreciated that with the use of such seed discs, a plurality of seed discs (in the illustrated embodiment, four seed discs 320-1' through 320-4') may be more easily arranged to release seeds in the same seed tube 232 and preferably to release seeds adjacent to the same vertical line (e.g., the intersection of planes Pt and P1). Moreover, such discs may be oriented at offset angular positions about a vertical axis (e.g., at about 90 degrees as illustrated) and release seeds adjacent to the same vertical line without contacting one another. In the embodiment of FIG. 22, each seed disc is preferably in communication with a distinct seed source as described elsewhere herein, e.g., the seeds 42-1 through 42-4 are preferably drawn from four distinct hoppers.

Figure 31:
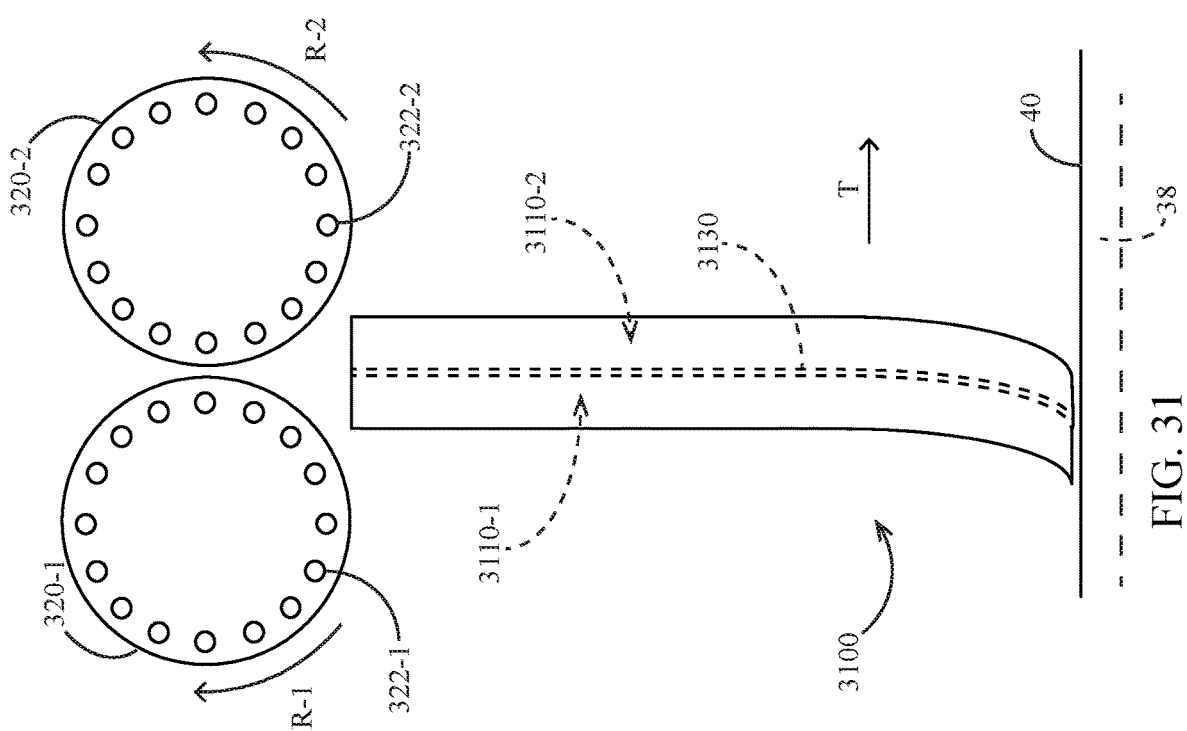
FIG. 31 is a side elevation view of an embodiment of a row unit having a seed tube with two seed channels.

A fifth embodiment of the row unit is illustrated in FIG. 31. In the fifth embodiment, the row unit includes a seed tube 3100 having two seed channels 3110-1 and 3110-2. The seed channel 3110-1 is preferably disposed to receive seeds falling by gravity from the first seed disc 320-1 (e.g., having an upper opening vertically below the seed release location of the first seed disc 320-1) and to deposit seeds into the trench 38. The seed channel 3110-2 is preferably disposed to receive seeds falling by gravity from the first seed disc 320-2 (e.g., having an upper opening vertically below the seed release location of the first seed disc 320-2) and to deposit seeds into the trench 38. The seed channel 3110-2 is preferably disposed longitudinally forward of the seed channel 3110-1 along the direction of travel T of the row unit. The seed channels 3110-1, 3110-2 are preferably separated by a wall 3130. The seed channels 3110-2 and the wall 3130 are preferably curved rearwardly at a lower end in order to guide seeds rearwardly before release into the trench 38.

Figure 32:
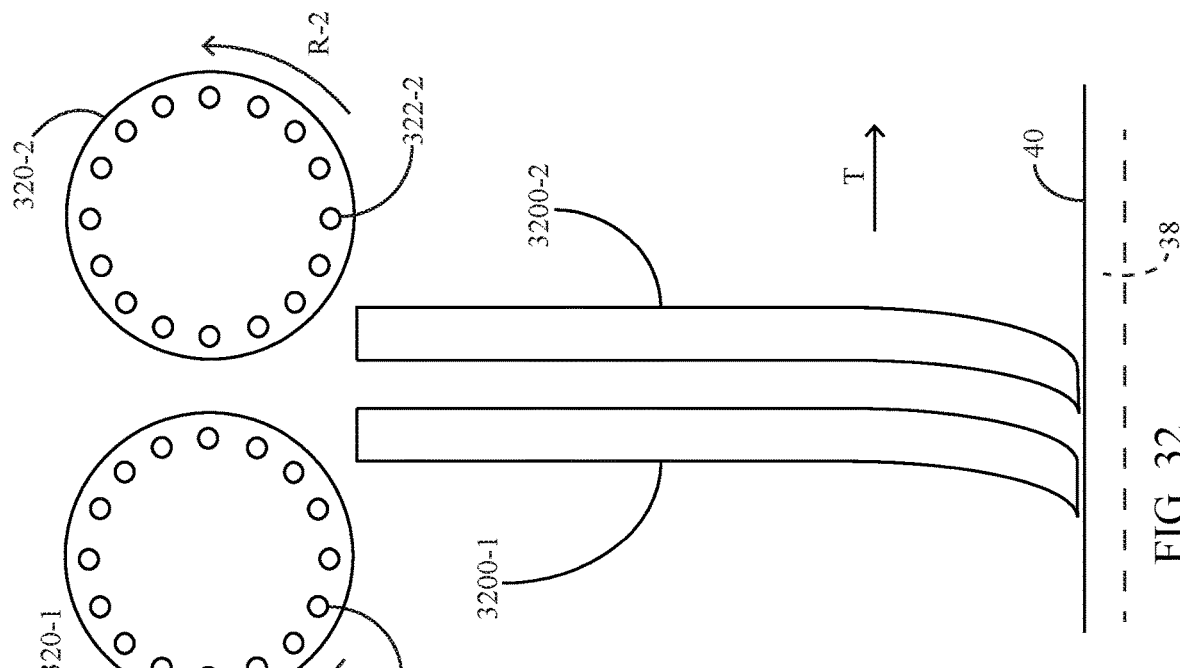
FIG. 32 is a side elevation view of an embodiment of a row unit having two seed tubes.

A sixth embodiment of the row unit is illustrated in FIG. 32. In the fifth embodiment, the row unit includes two seed tubes 3200-1, 3200-2. The seed tube 3200-1 is preferably disposed to receive seeds falling by gravity from the first seed disc 320-1 (e.g., having an upper opening vertically below the seed release location of the first seed disc 320-1) and to deposit seeds into the trench 38. The seed tube 3200-2 is preferably disposed to receive seeds falling by gravity from the first seed disc 320-2 (e.g., having an upper opening vertically below the seed release location of the first seed disc 320-2) and to deposit seeds into the trench 38. The seed tube 3200-2 is preferably disposed longitudinally forward of the seed channel 3200-1 along the direction of travel T of the row unit. The seed tubes 3200 are preferably curved rearwardly at a lower end in order to guide seeds rearwardly before release into the trench 38.

In other embodiments of the row unit 200, the meters 300 mounted to the row unit 200 release seeds into separate seed tubes or seed conveyors disposed to drop seeds into the same trench 38 opened by the row unit.

In other embodiments of the row unit 200, more than two seed meters 300 (e.g., three or four) are mounted to each row unit 200 and configured and disposed to release seeds into the trench 38 opened by the row unit. In such embodiments, more than two bulk hoppers 110 (e.g., three or four) are supported by the frame 12 and in seed communication with the meters (e.g., the third bulk hopper 110 is in seed communication with the third seed meter on each row unit 200).

In other embodiments of the row unit 200, a single drive 315 is coupled to both seed discs 320 and configured to simultaneously drive both seed discs. In such embodiments, each meter 300 preferably includes a clutch device (not shown) configured to prevent the meter from depositing seeds. Such a clutch device may comprise a vacuum cutoff device such as that disclosed in U.S. Pat. No. 8,234,988, incorporated herein by reference.

Seed Flow Splitter Embodiments

Referring to FIGS. 11-14, in some embodiments a flow splitter 1100 is used to divide flow of seed from a single bulk hopper 110 to supply two row units 200 with seed.

Figure 12:
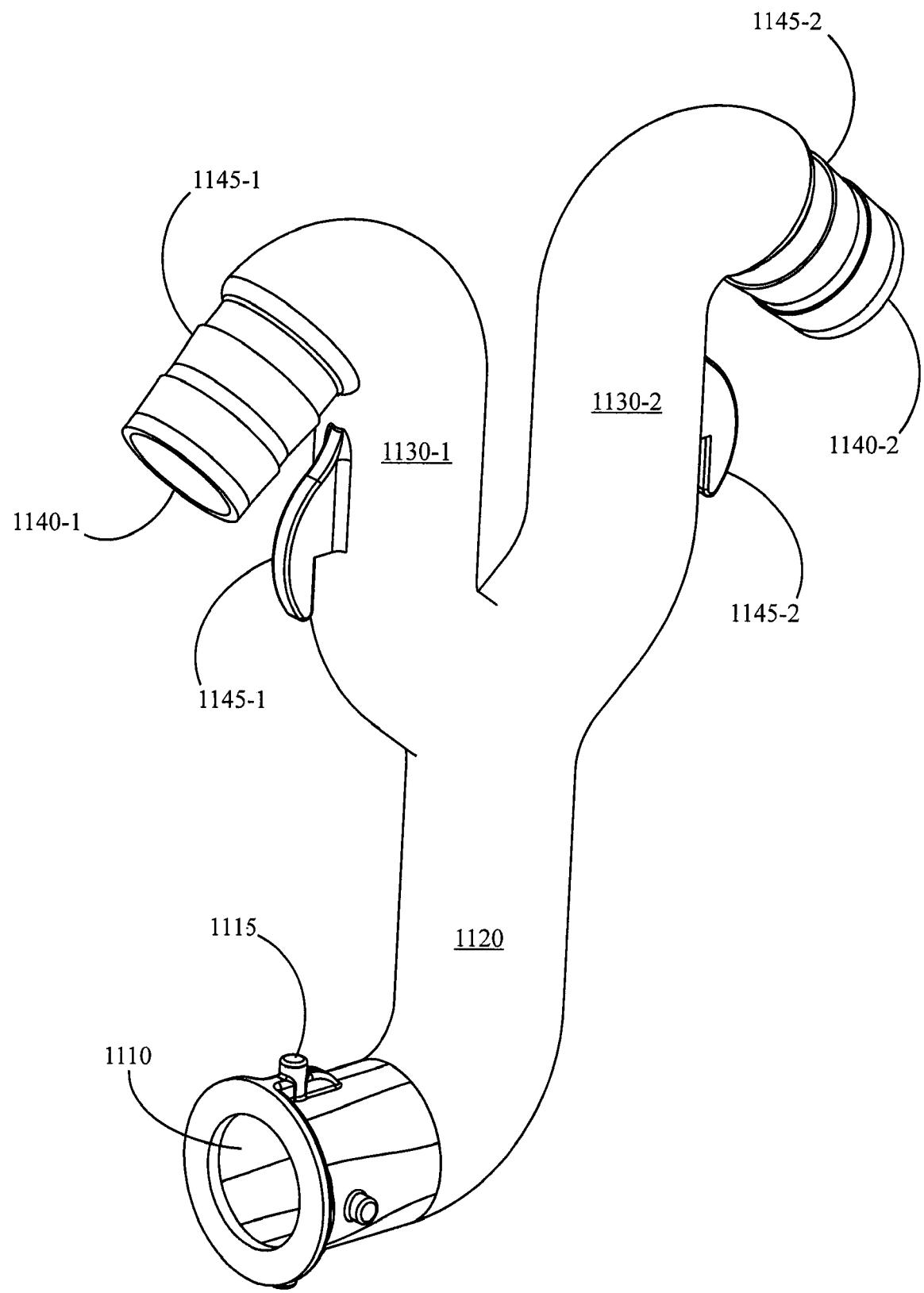
FIG. 12 is a perspective view of the flow splitter of FIG. 11.
Figure 13:
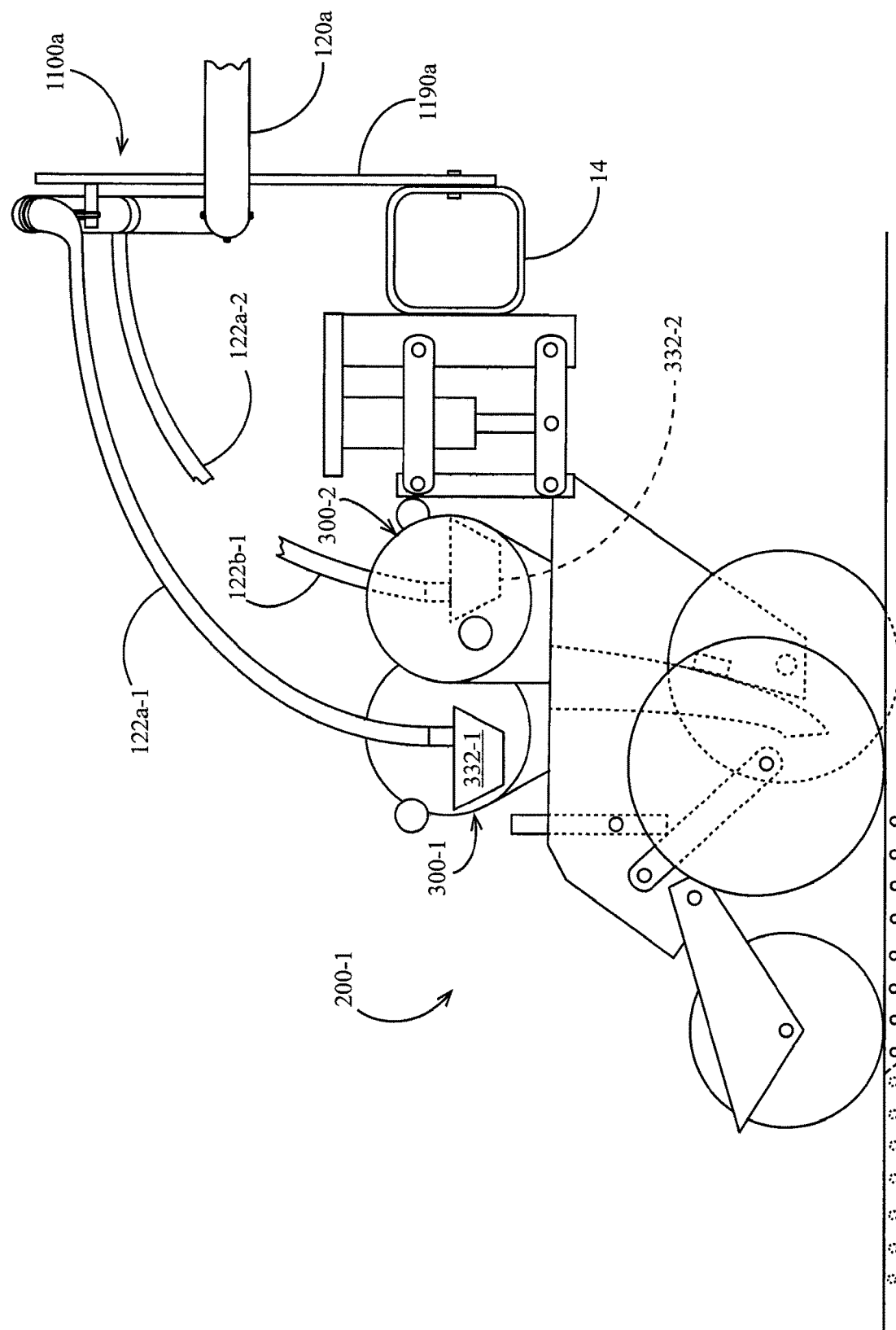
FIG. 13 is a side elevation view of a planter incorporating the flow splitter of FIG. 13, illustrating a first row unit of the planter.

Turning to FIG. 13, a first flow splitter 1100a is preferably mounted to the toolbar 14 by a bracket 1190a such that the splitter 1100a is disposed above the toolbar. Mounting hooks 1145 (FIG. 12) are preferably used to mount the flow splitter 1100a to the bracket 1190a. An inlet of the flow splitter 1100a is preferably in fluid and seed communication with the bulk hopper 110a (see FIG. 3) via the seed line 120a. A first outlet of the flow splitter 1100a is preferably in fluid and seed communication with the auxiliary hopper 332-1 of a first row unit 200-1 via a secondary seed line 122a-1. A second outlet of the flow splitter 1100a is preferably in fluid and seed communication with the auxiliary hopper 332-1 of a second row unit 200-2 via a secondary seed line 122a-2 (see FIG. 14).

Figure 14:
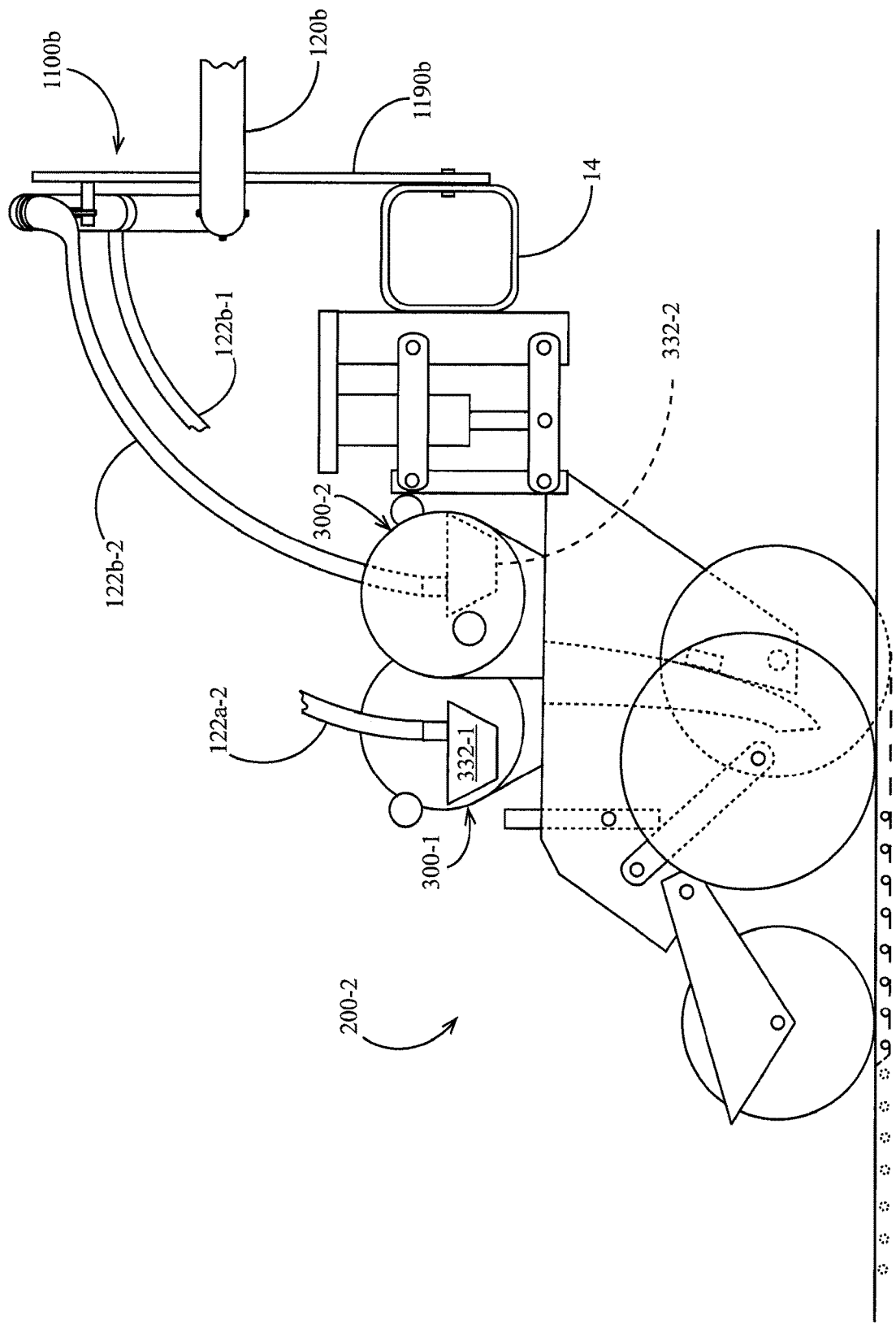
FIG. 14 is another side elevation view of the planter of FIG. 13, illustrating a second row unit of the planter.

Turning to FIG. 14, a second flow splitter 1100b is preferably mounted to the toolbar 14 by a bracket 1190b such that the splitter 1100b is disposed above the toolbar. An inlet of the flow splitter 1100b is preferably in fluid and seed communication with the bulk hopper 110b (see FIG. 3) via the seed line 120b. A first outlet of the flow splitter 1100b is preferably in fluid and seed communication with the auxiliary hopper 332-1 of the second row unit 200-2 via a secondary seed line 122b-2. A second outlet of the flow splitter 1100b is preferably in fluid and seed communication with the auxiliary hopper 332-2 of the first row unit 200-1 via a secondary seed line 122b-1 (see FIG. 14).

Figure 11:
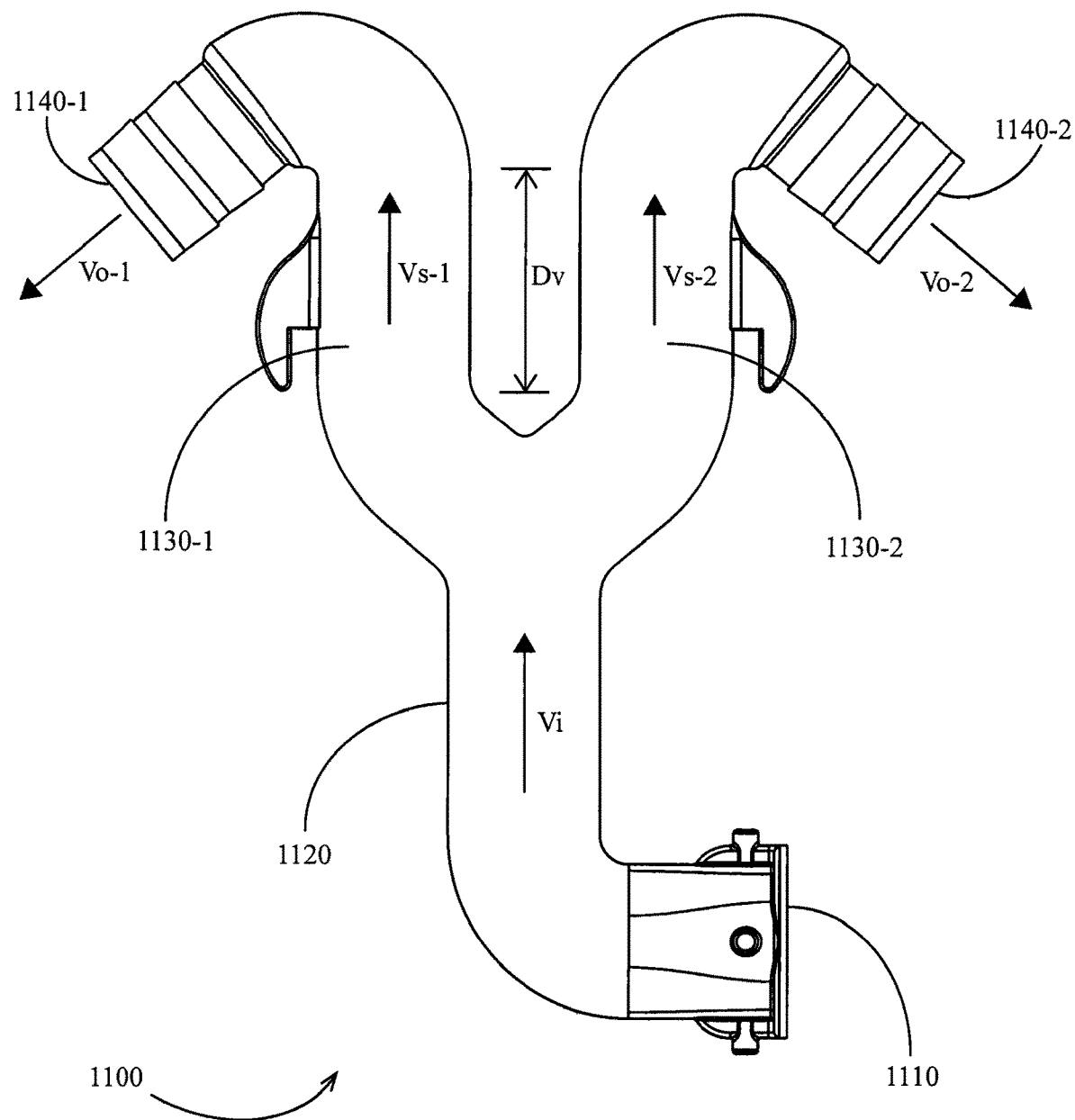
FIG. 11 is a front elevation view of an embodiment a flow splitter.

Turning to FIGS. 11 and 12, the flow splitter 1100 is illustrated in more detail. The flow splitter 1100 preferably includes an inlet 1110, an inlet flow portion 1120, a first split flow portion 1130-1, a second split flow portion 1130-2, a first outlet 1140-1, and a second outlet 1140-2. The inlet 1110 preferably includes coupling features 1115 for twist-and-lock coupling with the seed line 120. The outlets 1140 preferably include hose coupling ribs 1145 for securing the outlets to secondary seed lines 122.

In operation of the flow splitter 1100, seed entering the inlet 1110 preferably has a generally approximately horizontal flow path. When the flow splitter 1100 is installed on the planter, the inlet flow portion 1120 preferably defines a flow and seed velocity vector Vi less than 70 degrees from vertical and preferably approximately vertical. When the flow splitter 1100 is installed on the planter, the inlet flow portion 1120 preferably defines an air and seed velocity vector Vi less than 70 degrees from vertical and preferably approximately vertical. After traveling through the inlet flow portion 1120, seed and air flow divides between the first split flow portion 1130-1 and the second split flow portion 1130-1. When the flow splitter 1100 is installed on the planter, each split flow portion 1130 preferably defines an air and seed velocity vector Vs less than 70 degrees from vertical and preferably approximately vertical. Each split flow portion 1130 preferably defines the velocity vector Vs over a travel distance Dv sufficient to allow seeds traveling only by momentum (i.e., not under the influence of air flow) to slow from its entry speed to a full stop such that the seed does not travel to the outlet 1140 without being influenced by air flow. In preferred embodiments, the distance Dv is preferably greater than about 1.5 inches. In the illustrated embodiment, when travelling from the split flow portion 1130 to the outlet 1140, seed and air flow preferably changes direction by an angle greater than 90 degrees. When the flow splitter 1100 is installed on the planter, the outlets 1140 preferably each define an air and seed velocity vector Vo more than 20 degrees below horizontal and preferably approximately 45 degrees below horizontal.

In other embodiments, the splitters 1100 are replaced with flow splitters mounted to the row units 200 as disclosed in U.S. Pat. No. 7,025,010, the disclosure of which is hereby incorporated by reference herein. In such embodiments, a seed line from a first bulk hopper is in fluid and seed communication with an inlet of a flow splitter on a first row unit, a first outlet of the flow splitter is in fluid and seed communication with a seed meter on the first row unit, and a second outlet is in fluid and seed communication with a seed meter on the second row unit. In such embodiments, the first outlet is preferably connected directly to the seed meter on the first row unit via a quick-connect coupler such as a twist-and-lock coupler. Further, the second outlet is preferably connected to the seed meter on the second row unit via a secondary seed line; the secondary seed line is preferably connected to an inlet of a second flow splitter on the row unit via a quick-connect coupler such as a twist-and-lock coupler.

Row Unit Seed Hopper Embodiments

Figure 15:
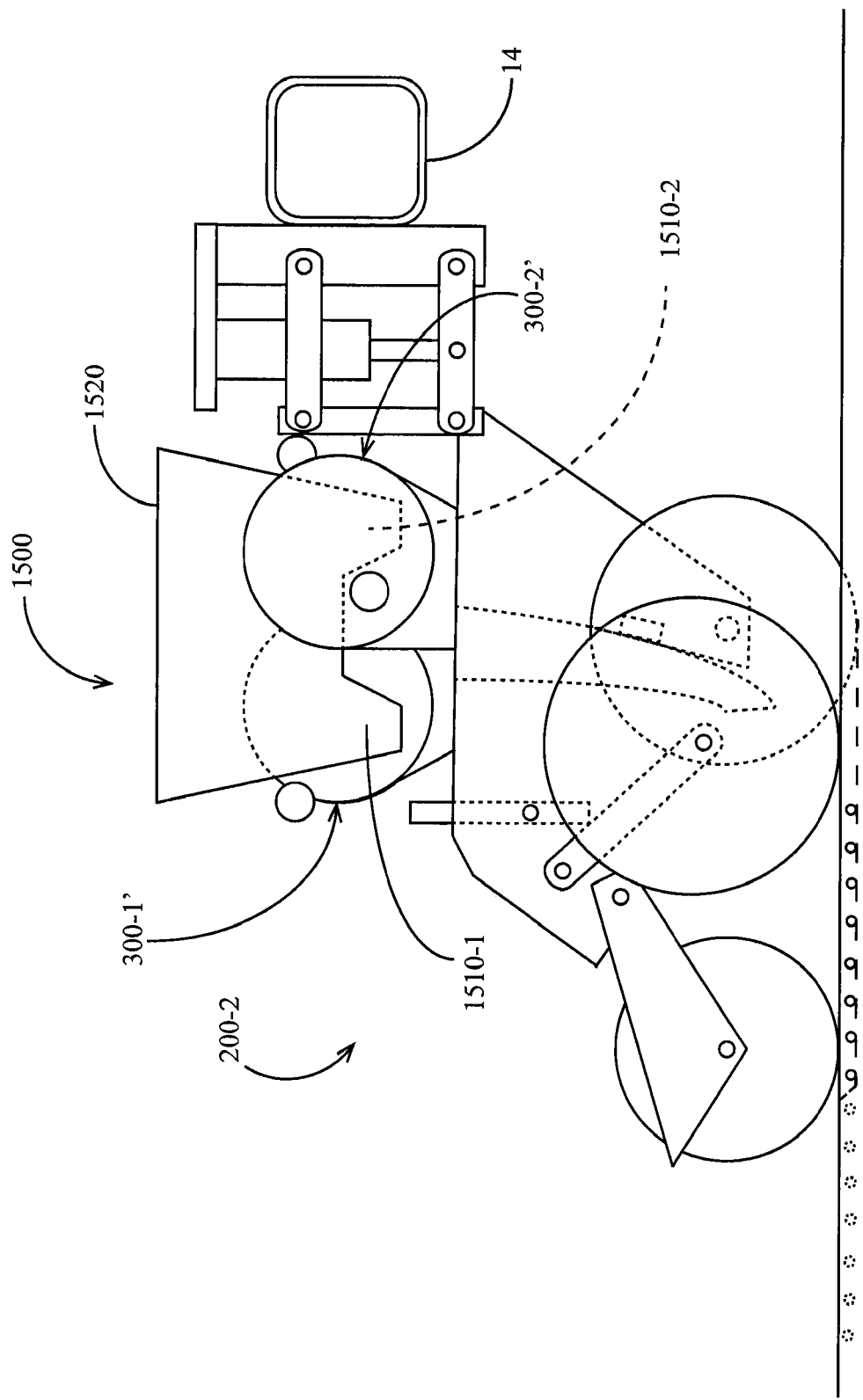
FIG. 15 is a side elevation view of a planter row unit incorporating an embodiment of an on-row seed hopper.
Figure 16B:
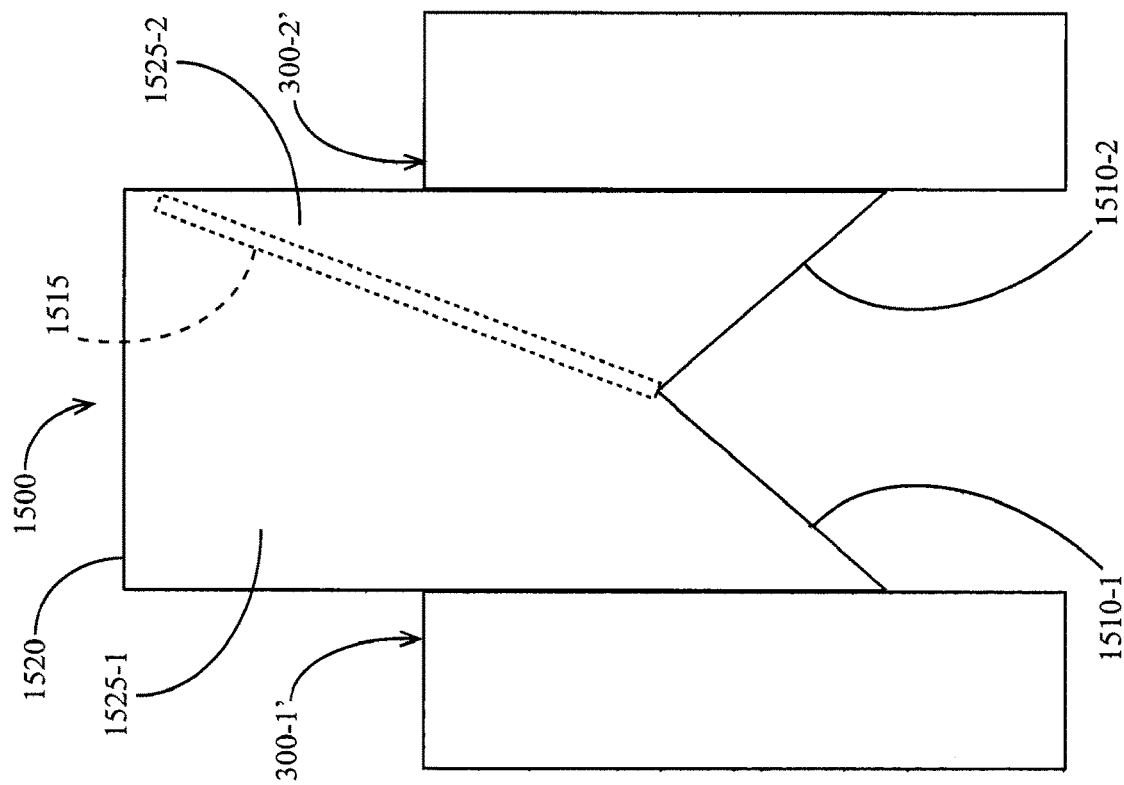
FIG. 16B is a rear elevation view of the seed hopper of FIG. 16A including divider in a second position.
Figure 16A:
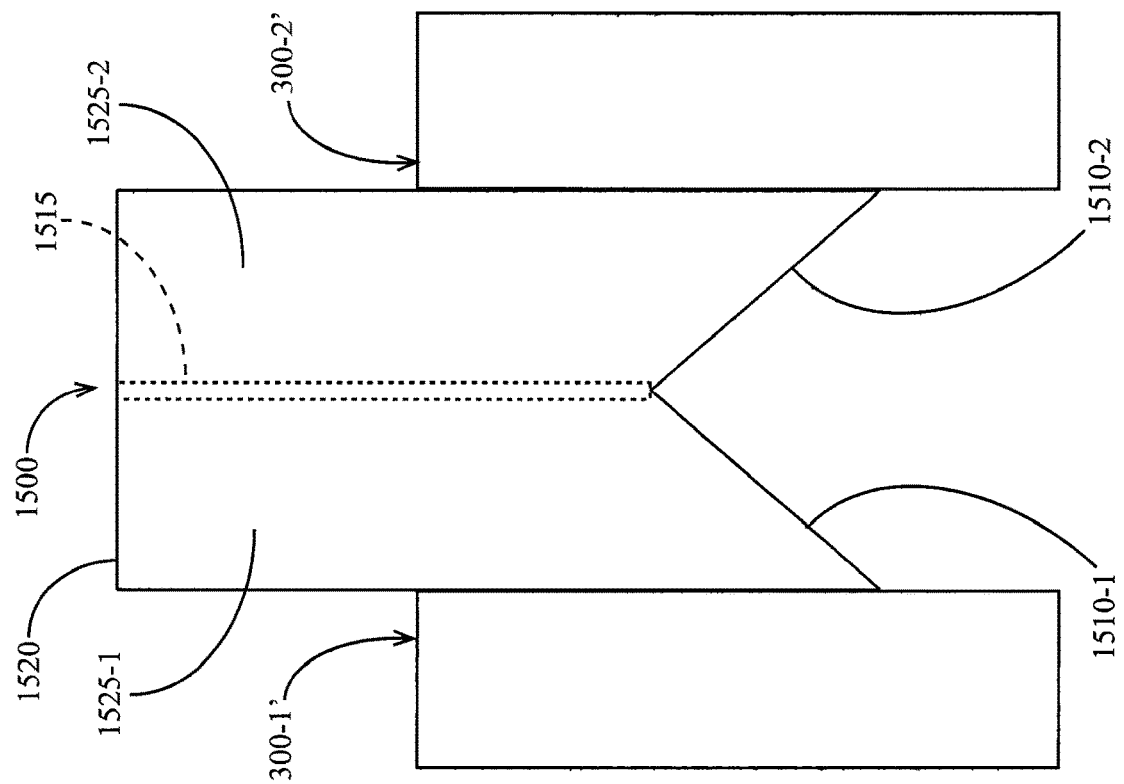
FIG. 16A is a rear elevation view of an embodiment of a seed hopper including a divider in a first position.
Figure 17:
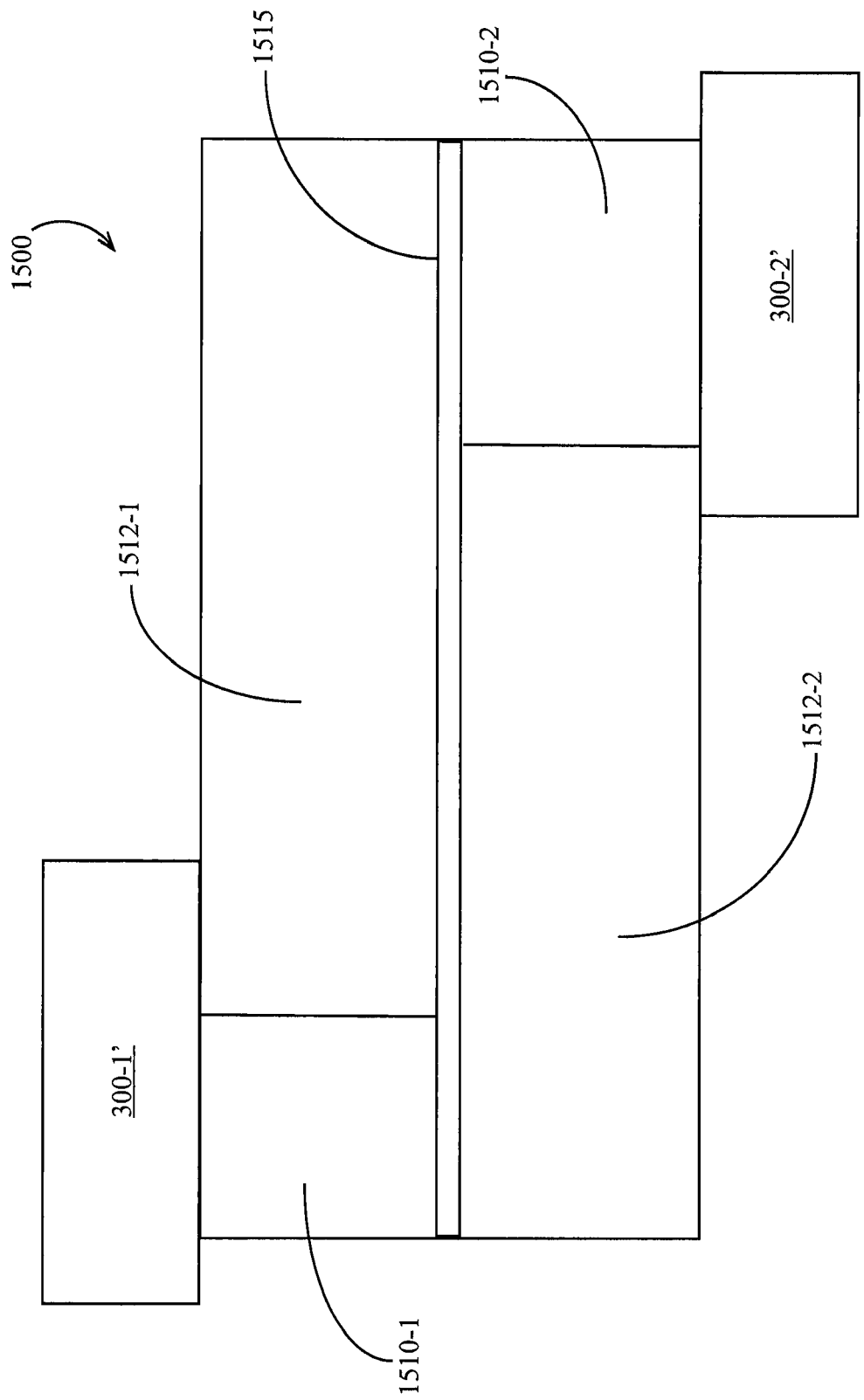
FIG. 17 is a plan view of the seed hopper of FIG. 16A including a divider in the first position.

Referring to FIGS. 15-17, in alternative embodiments one or both seed meters 300 on the row unit 200 are in seed communication with a seed hopper 1500 supported by the planter. Each seed meter is preferably in communication with a seed containing volume 1525; in operation, seed from the hopper 1500 preferably enters the seed side housing of the meter 300 after traveling by gravity down an inclined surface 1510. Referring to FIG. 17, an inclined surface 1512 preferably guides seed by gravity toward the inclined surface 1510-1; for example, on the view of FIG. 17 the rightmost end of the surface 1512-1 is preferably at a higher elevation than the leftmost end of the surface 1512-1. Each seed containing volume 1525 is preferably approximately 1.6 bushels or greater. In the illustrated embodiment, a single seed hopper 1500 includes a single interior volume 1520 separated into two seed containing volumes 1525-1, 1525-2 by a divider 1515; the interior volume 1520 is preferably approximately 3 bushels or greater. Referring to FIG. 16B, in a preferred embodiment the divider 1515 may be selectively tipped into an orientation in which seed added to the hopper 1500 is only communicated to the seed meter 300-1; in this orientation, the seed containing volume 1525-1 is preferably larger than in the configuration of FIG. 16A. Referring to FIGS. 16C through 16E, another embodiment of a divider 1515' may be inserted into one of a plurality of vertical guide slots (not shown) in the hopper 1500 in order to selectively vary the ratio of seed types in the hopper. As illustrated, the divider 1515' preferably includes a vertical sidewall portion and an angled portion which cooperate to define two unequal volumes in the seed hopper. In FIG. 16C, the divider 1515' is in a first position in which the seed containing volume 1525-1 is larger than the seed containing volume 1525-2. In FIG. 16D, the divider 1515' is in a second position in which the seed containing volume 1525-2 is larger than the seed containing volume 1525-1. In FIG. 16E, the divider is in a third position in which the vertical sidewall divides the hopper 1500 such that the seed containing volumes 1525-1 and 1525-2 have substantially equal similar volumes.

Toolbar Seed Hopper Embodiments

Figure 20:
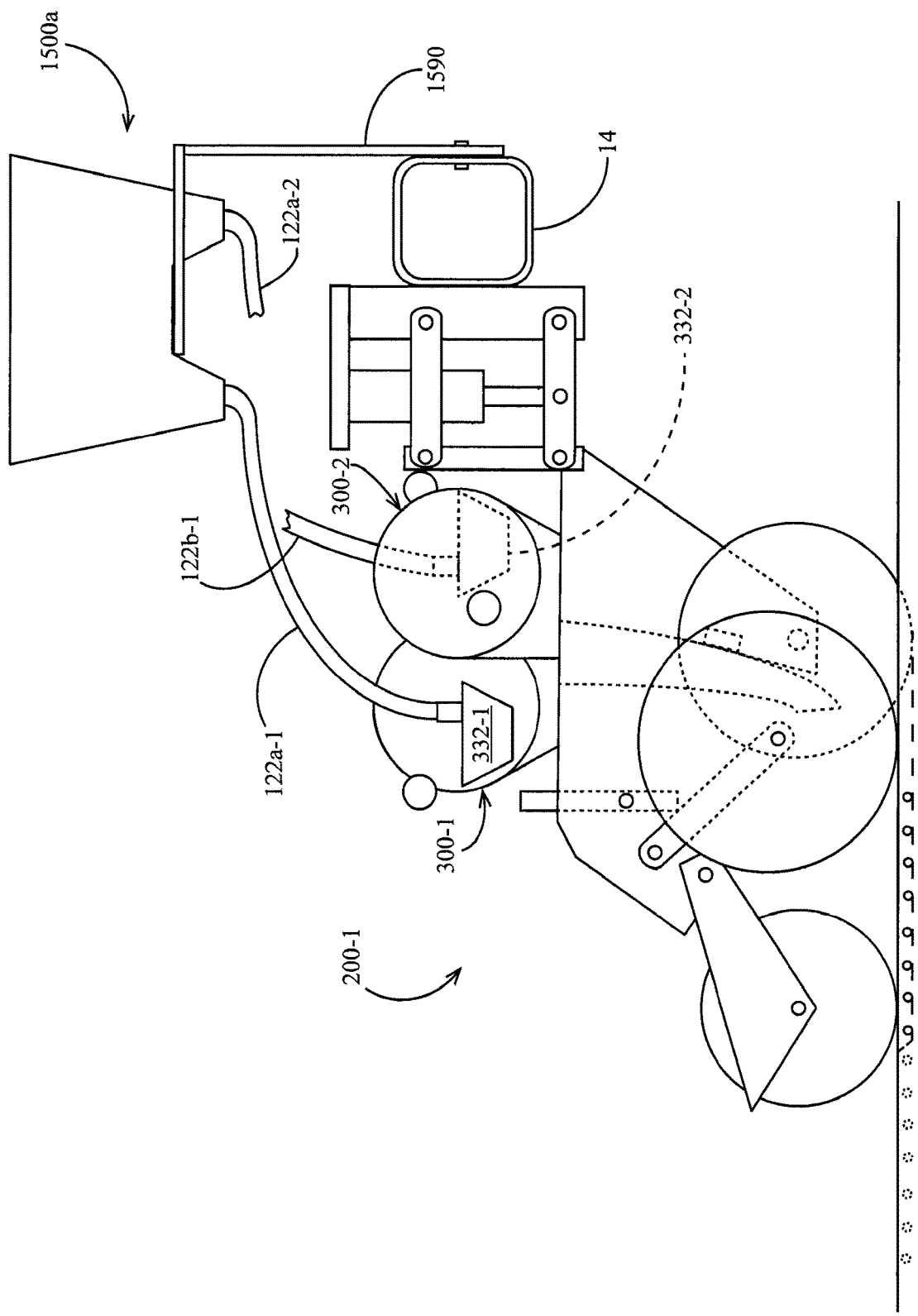
FIG. 20 is a side view of an embodiment of a planter having a seed hopper supported by a toolbar.

Referring to FIG. 20, in some embodiments a plurality of seed hoppers are mounted to the toolbar 14 for supplying seed to the meters 300 on the row units 200. In the illustrated embodiment, the seed hoppers comprise seed hoppers 1500 described above, mounted to the toolbar 14 via a bracket 1590. Each seed hopper is preferably in seed communication with two seed meters 300 via seed lines 122, preferably in a similar fashion to the lines connecting the splitters 1100 described above with respect to FIGS. 13 and 14. The seed hopper 1500 is preferably mounted in an elevated position relative to the meters 300 such that seed descends through the tubes by gravity. In the illustrated embodiment, a first seed hopper 1500a supplies a first seed type to the seed meter 300-1 on a first row unit 200-1 and supplies the first seed type to a seed meter 300-1 on a second row unit 200-2 (not shown); thus in the illustrated embodiment, no divider 1515 is preferably inserted in the hopper 1500a and the hopper is preferably filled only with the first seed type. In the illustrated embodiment, a second seed hopper 1500b (not shown) is preferably similarly mounted to the toolbar and in seed communication with seed meters 300-2 on the row unit 200-1 as well as the row unit 200-2 (not shown) for supplying a second seed type to the seed meters 300-2 on the row units 200-1, 200-2. In other embodiments, the hopper 1500 is in seed communication with the first seed meter 300-1 on the row unit 200-1 as well as the second seed meter 300-2 on the row unit 200-1; in such embodiments, a divider 1515 is preferably inserted in the hopper 1500 and the two resulting seed containing volumes are filled with the first seed type and the second seed type, respectively.

Drive Control Methods

Figure 10:
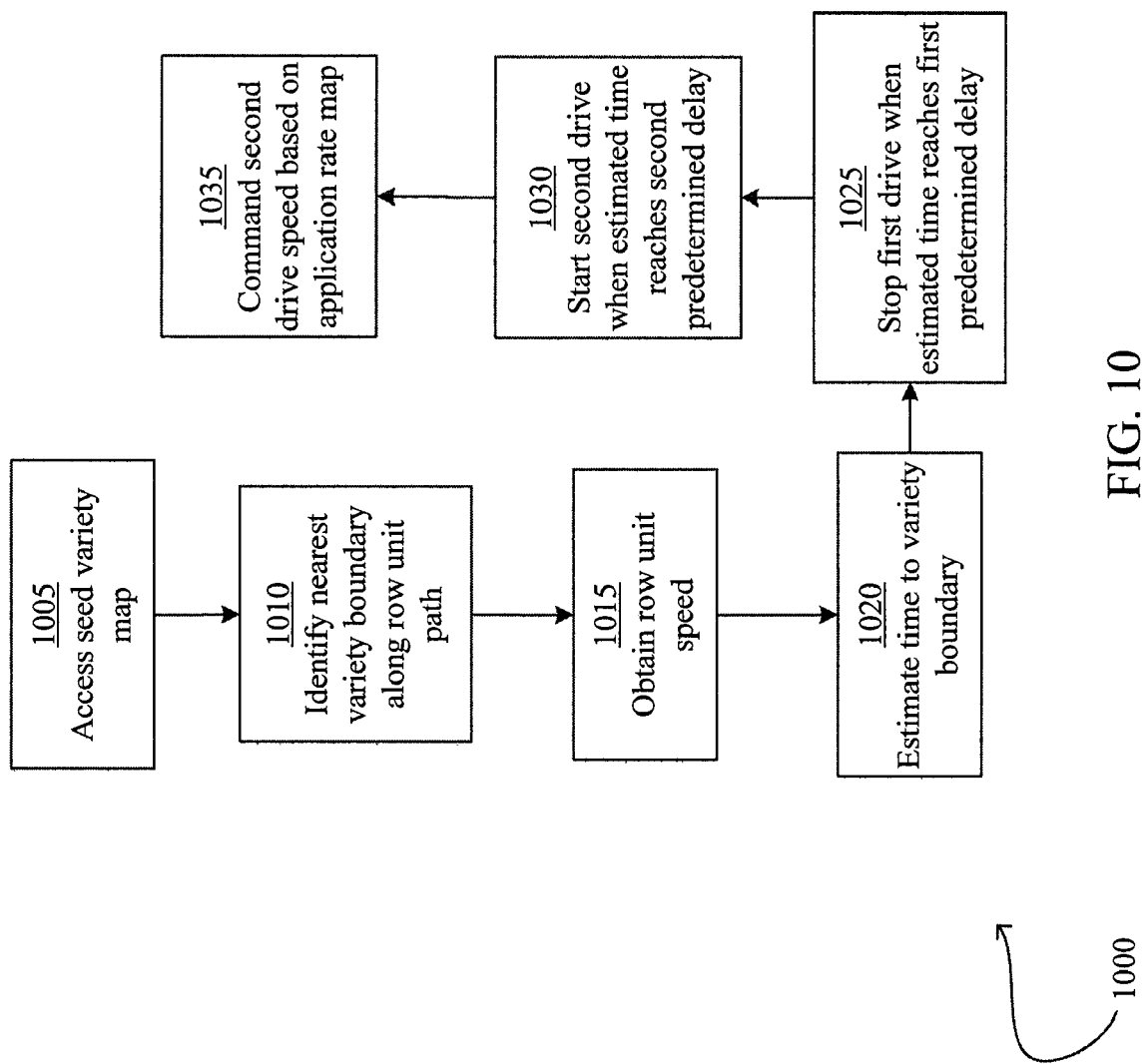
FIG. 10 illustrates an embodiment of a process for controlling a planter.

Turning to FIG. 10, a process 1000 is illustrated for selecting a seed variety planted by the one of the embodiments of the row unit 200 of the variety selection system 100. At step 1005, the planter monitor 190 preferably accesses a seed variety map, preferably stored in the memory of the planter monitor. The seed variety map preferably comprises a file (e.g., a shape file) associating desired seed types with geo-referenced locations. In other embodiments, two separate shape files may be used to independently control the meters 300; in such embodiments the a first map file preferably instructs the first meter not to plant at locations for which the second map file instructs the second meter to plant, and vice versa. At step 1010, the planter monitor 190 preferably identifies the nearest variety boundary (i.e., boundary at which the currently desired seed variety is no longer desired and a different seed variety is desired) along the current path traveled by the row unit 200. At step 1015, the planter monitor 190 preferably obtains the speed of the row unit 200 using one of the methods disclosed in the '327 application. At step 1020, the planter monitor 190 preferably estimates the time to the nearest variety boundary, e.g., by dividing the distance to the variety boundary by the speed of the row unit. At step 1025, the planter monitor 190 preferably compares the time estimated at step 1020 to a first predetermined delay and commands the first drive 315-1 to stop when the time estimated at step 1020 is equal to the first predetermined delay. The first predetermined delay preferably corresponds to an empirically determined delay between transmission of a command to stop the meter 300-1 and the last seed from the meter 300-1 being sensed by the seed sensor 150. At step 1030, the planter monitor 190 preferably compares the time estimated at step 1020 to a second predetermined delay and commands the second drive 315-2 to start when the time estimated at step 1020 is equal to the second predetermined delay. The second predetermined delay preferably corresponds to an empirically determined delay between transmission of a command to start the meter 300-2 and the first seed from the meter 300-2 being sensed by the seed sensor 150. In other embodiments, rather than using a first and second predetermined delay, the planter monitor 30 preferably simultaneously commands the first drive 300-1 to stop and the second drive 300-2 to start when the time estimated at step 1020 is equal to a switch delay. At step 1035, the planter monitor preferably commands a speed to the second drive 315-2 based on an application rate map stored in the memory of the planter monitor and associating desired application rates with geo-referenced locations.

In other embodiments of the process 1000, the planter monitor 190 commands both meters 300-1, 300-2 associated with the row unit 200 to plant in a blended zone defining a region between two seed variety map regions calling for different seed varieties. In such embodiments, the planter monitor 190 preferably commands both meters to plant at half the rate associated by the application rate map with each location in the blended zone. It should be appreciated that such embodiments are beneficial when the first seed variety and second seed variety comprise soybeans. In some such embodiments, the seed variety map does not include a blended zone and the system 100 implements a blended zone at all locations within a predetermined distance (e.g., 20 feet) of a variety boundary.

In some embodiments, the planter monitor 190 is configured to receive an input from the operator placing the planter monitor in a "single input" mode wherein both bulk hoppers 110*a*, 110*b* are filled with the same seed type. In the "single input" mode, rather than executing the process 1000, the planter monitor 190 commands the first seed meter to plant until an empty signal is received. Once the empty signal is received, the planter monitor 190 preferably commands the first meter to stop and commands the second seed meter to plant. The empty signal may comprise a signal from a sensor (e.g., an optical sensor or a scale) configured to generate a signal corresponding to the fill level of a bulk hopper or a row unit hopper. The empty signal may also comprise a signal from one or more seed sensors indicating that no seeds have been planted for a predetermined time or distance over which the first meter was commanded to plant.

Figure 19:
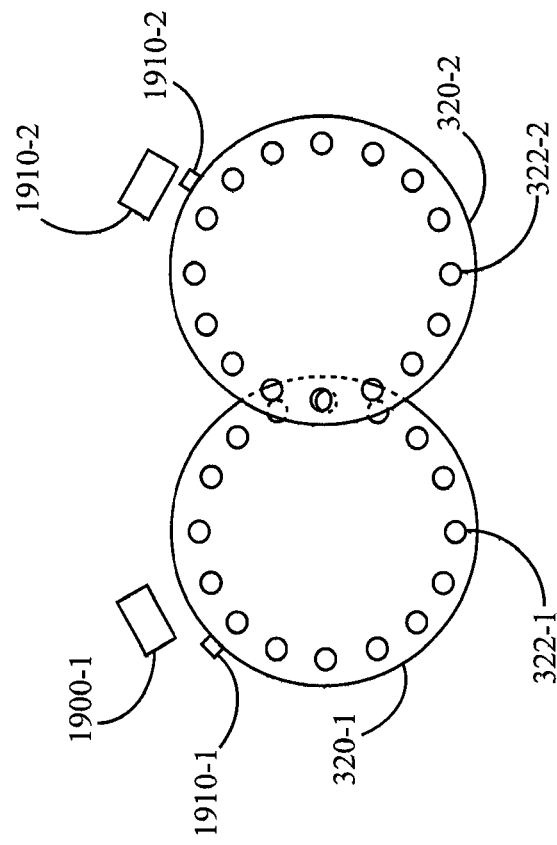
FIG. 19 is a side view of an embodiment of a row unit having two seed meters and including disc position sensors.

In some embodiments of the process 1000, the planter monitor 190 adjusts an angular position or velocity of one or more of the seed discs 320 in order to achieve a desired alignment of the seed discs. It should be appreciated that such embodiments may be useful when simultaneously planting with both seed discs 320 such that seeds on the first seed disc 320-1 do not contact seeds on the second seed disc 320-2. In some desired alignments, the seed apertures 322 are not transversely adjacent to each other. In one such desired alignment, the angular positions of the seed discs 320 are offset by one half of the angle between neighboring seed apertures 322 on one of the seed discs. In some such embodiments the planter monitor 190 adjusts the angular position or velocity of a seed disc 320 based on a disc alignment signal in order to achieve the desired alignment. Referring to FIG. 19, the disc alignment signal may comprise a signal generated by a Hall-effect sensors 1900 disposed adjacent to the seed disc 320 and disposed to generate a pulse when a magnet 1910 mounted to the seed disc passes the Hall-effect sensor. In such embodiments, one such Hall-effect sensor is associated with both seed discs 320 on the row unit and the planter monitor 190 preferably slows or accelerates one of the seed discs 320 in order to achieve a desired time between subsequent pulses in the signals received from both a first Hall-effect sensor 1900-1 and a second Hall-effect sensor 1900-2. In other embodiments, the seed pulse signal from the seed sensor 150 is used as a disc alignment signal; in such embodiments, the planter monitor 190 preferably slows or accelerates one of the seed discs 320 in order to achieve a desired time ratio (e.g., 1 to 1) between subsequent seed pulses in the signal generated by the seed sensor 150.

Although the foregoing description primarily describes systems, methods, and apparatus of input selection with respect to seed planting, it should be appreciated that the same systems, methods, and apparatus may be used to vary between types of other granular agricultural inputs such as granular fertilizer.

Single-Hybrid Operation Methods

The seed variety selection system 100 is preferably reconfigurable into a "single hybrid" mode in which the system is configured to plant a single seed type (e.g., single hybrid) from both bulk hoppers 110.

Figure 34:
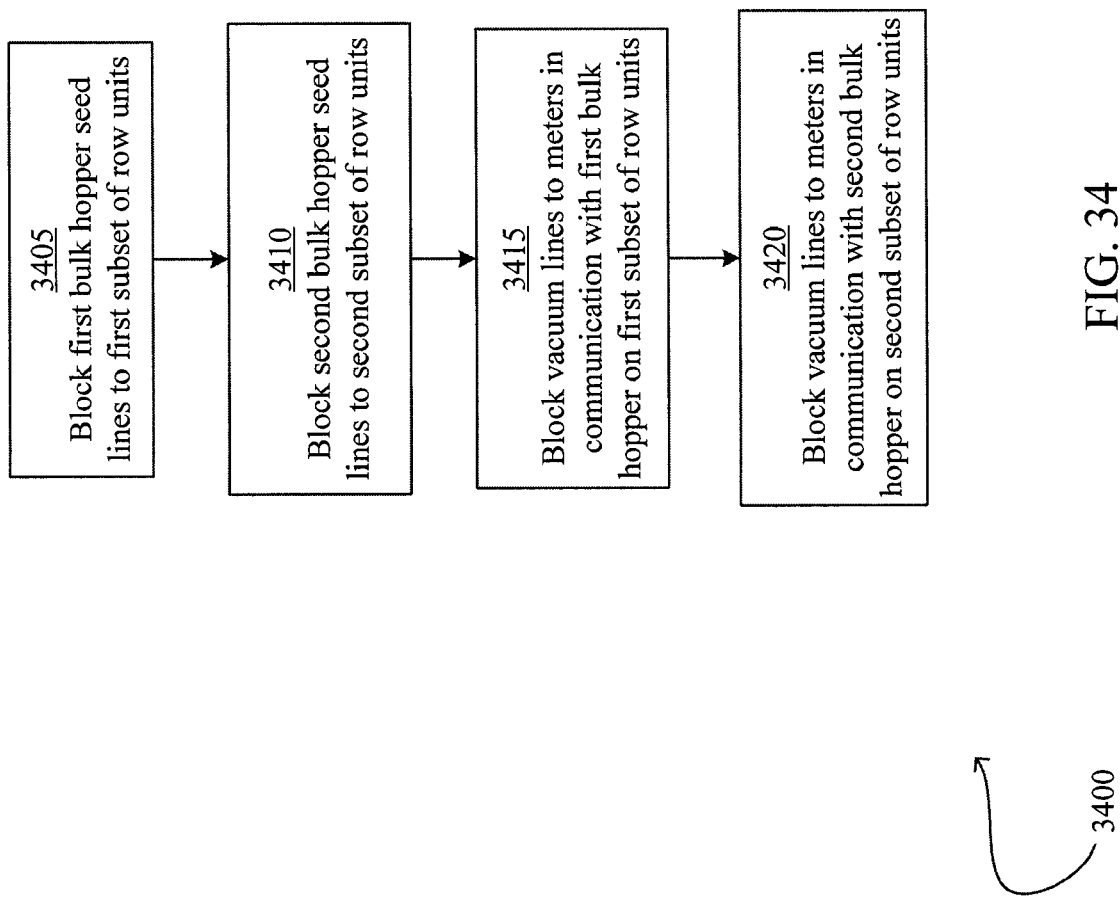
FIG. 34 illustrates an embodiment of a process for operating a seed variety selection system in a single-hybrid mode.

Thus, referring to FIG. 34, in some embodiments the seed variety selection system 100 is configured to enable a reconfiguration process 3400. At step 3405, the seed lines 120 connecting the first bulk hopper 110-1 to a first subset of row units 200 are preferably blocked to air flow. In a preferred embodiment, the first subset of row units comprises all of the row units on the right-hand side of the planter. At step 3410, the seed lines 120 connecting the second bulk hopper 110-2 to a second subset of row units 200 are preferably blocked to air flow. In a preferred embodiment, the second subset of row units comprises all of the row units on the left-hand side of the planter.

Each seed line 120 may be blocked manually by the operator using a removable plug in the seed line or at the pneumatic connection between the seed line and the seed meter or entrainer outlet. Alternatively, each seed line may be manually closed using a valve or closed via an electrically operated valve or actuator in electrical communication with the planter monitor 190.

At step 3415, the vacuum lines 172 connecting the vacuum source 170 to the meters disconnected from the first bulk hopper 110-1 at step 3405 (i.e., on the first subset of row units) are preferably blocked to air flow. At step 3420, the vacuum lines 172 connecting the vacuum source 170 to the meters disconnected from the second bulk hopper 110-2 at step 3410 (i.e., on the second subset of row unites) are preferably blocked to air flow.

In some embodiments, instead of completely blocking vacuum flow to one of the meters on each row unit for operation in a single-hybrid mode, an orifice (not shown) is inserted into the vacuum line 172 connecting the vacuum source 170 to each meter disconnected from the first bulk hopper 110-1 in order to partially block air flow. In some embodiments, the orifice includes an opening sized to reduce the area open to vacuum flow by about 70%. In some embodiments, the orifice includes an opening sized to reduce air flow by approximately 75%. The pressure at the vacuum source 170 in operation of such embodiments may be approximately 20 inches of water in some implementations.

Each vacuum line 172 may be blocked manually by the operator using a removable plug in the vacuum line or at the pneumatic connection between the vacuum line and the seed meter or the vacuum source. Alternatively, each vacuum line may be manually closed using a valve or closed via an electrically operated valve or actuator in electrical communication with the planter monitor 190. It should be appreciated that each vacuum line may be closed by a single valve or actuator disposed to close off air flow to each vacuum line.

Figure 35:
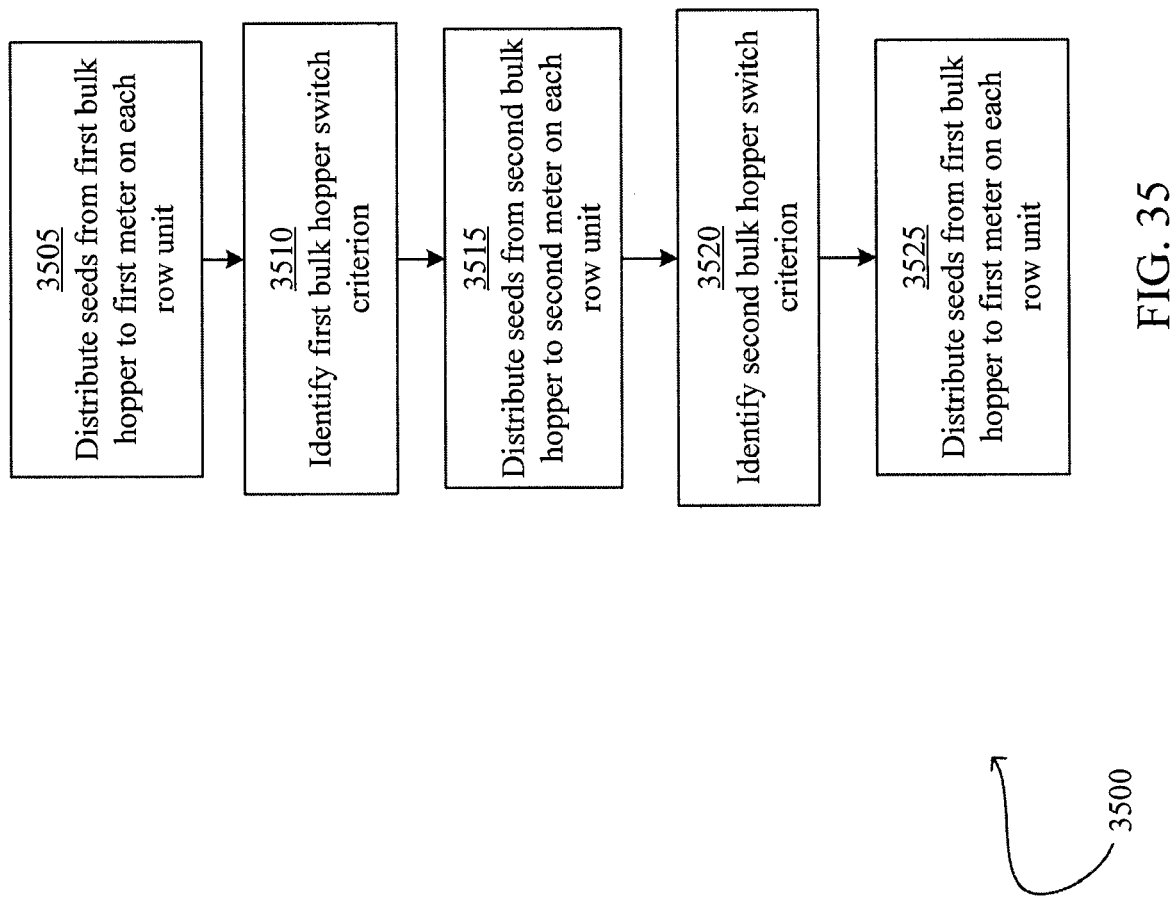
FIG. 35 illustrates another embodiment of a process for operating a seed variety selection system in a single-hybrid mode.

In other embodiments, the system 100 is configured to enable operation in a single-hybrid mode in which the system alternately plants from the first bulk hopper 110-1 and the second bulk hopper 110-2. In such embodiments the system 100 the currently "active" bulk hopper (i.e., the bulk hopper being planted from at the current time) preferably distributes seed to one meter on each of the row units; after the bulk hopper switch is executed the next "active" bulk hopper preferably distributes seed to another meter on all of the row units. Thus, referring to FIG. 35, in such embodiments the system 100 is preferably configured to carry out a bulk hopper switching process 3500.

At step 3505, the system 100 preferably distributes seed from the first bulk hopper 110-1 to one of the seed meters (e.g., seed meter 300-1) on each row unit 200 on the planter. At step 3510, the system 100 preferably identifies a first bulk hopper switch criterion. Upon identifying the first bulk hopper switch criterion, at step 3515 the system 100 preferably "switches" to distributing seed from the second bulk hopper 110-2 to another seed meter (e.g. seed meter 300-2) on each row unit 200 on the planter (e.g., by stopping the first meters 300-1 from metering seed and commanding the second meters 300-2 to meter seed).

The bulk hopper switch criterion of step 3510 may comprise any of the following: the planter being in a lifted configuration (e.g., determined by a lift switch signal or lift command); a predetermined number of passes executed (e.g., determined by directional change reported by the GPS receiver, a lift switch signal or lift command); a number of seeds dispensed (e.g., as counted by a seed sensor or estimated based on meter speed); a distance traveled (e.g., based on radar or GPS coordinates); or a time elapsed. In preferred embodiments, the bulk hopper switch criterion is met at regular and relatively close intervals (e.g. after each pass) such that the bulk hoppers have approximately equal weight during planting operations. In other embodiments, the bulk hopper switch criterion comprises a time elapsed without seed being sensed by one (or a plurality or all) of the seed sensors, such that the bulk hopper switch criterion is met only when the active bulk hopper has been substantially emptied.

At step 3520, the system 100 preferably identifies a second bulk hopper switch criterion. Upon identifying the second bulk hopper switch criterion, at step 3525 the system 100 preferably "switches" to distributing seed from the first bulk hopper 110-1 to another seed meter (e.g. seed meter 300-1) on each row unit 200 on the planter (e.g., by stopping the first meters 300-2 from metering seed and commanding the second meters 300-1 to meter seed).

The bulk hopper switch criterion of step 3520 may comprise any of those criteria recited with respect to step 3510 and preferably comprises the same criterion used at step 3510.

It should be appreciated that the methods and apparatus for blocking airflow in unused vacuum lines and seed lines described above with respect to reconfiguration process 3400 may be implemented upon each bulk hopper switch in the bulk hopper switching process 3500.

Vacuum, Seed and Data Connections

Figure 36:
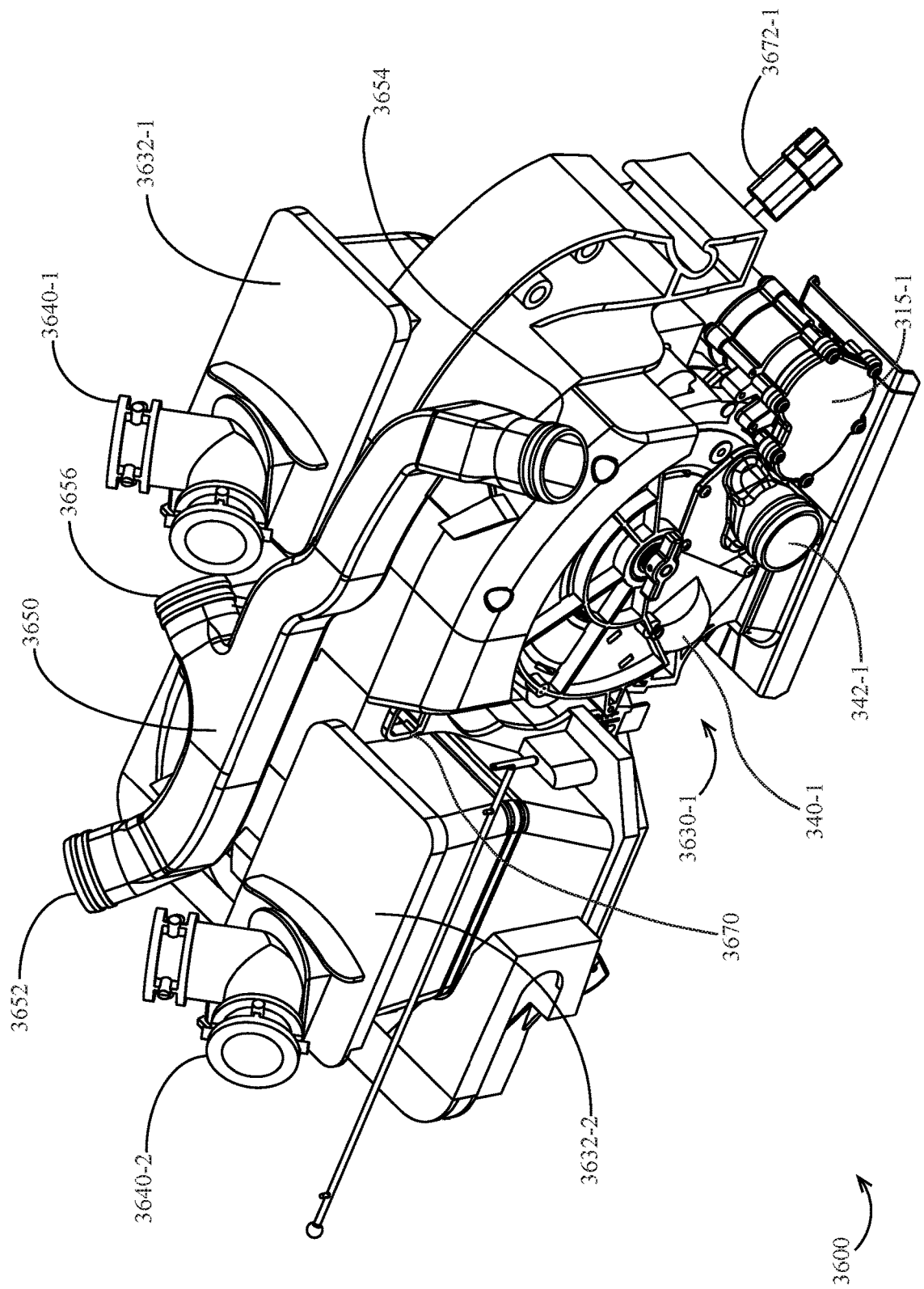
FIG. 36 illustrates another embodiment of a row unit.

FIG. 36 illustrates an embodiment of a row unit 3600 having two seed meters 3630-1, 3630-2 (only 3630-1 is visible in FIG. 36) is illustrated in FIG. 36. As described in connection with the previous embodiments, each seed meter 3630-1, 3630-2 preferably includes a seed side housing 330 and a vacuum side housing 340, identified by reference numerals 330-1, 330-2 and 340-1, 340-2 respectively for each of the seed meters 3630-1 and 3630-2 respectively. An auxiliary hopper 3632 preferably contains seed and supplies seed by gravity into the seed side housing 330 for planting by the seed meter 3630.

Seed is preferably pneumatically supplied to the first auxiliary hopper 3632-1 from the first bulk hopper 110-1 and to the second auxiliary hopper 3632-2 from the second bulk hopper 110-2. In the illustrated embodiment, a splitter 3640 associated with each auxiliary hopper 3632 receives seed from an auxiliary hopper on a first adjacent row unit (or on the left- or right-most row unit, directly from the bulk hopper) and supplies seed to another auxiliary hopper on a second adjacent row unit. In some embodiments, the splitter 3640 is configured to supply seed to the auxiliary hopper on the second row unit only after the auxiliary hopper associated with the splitter has been substantially filled with seed. In this way, the first bulk hopper 110-1 supplies seed to a first set of seed meters 3630-1 on each row unit and the second bulk hopper 110-2 supplies seed to a second set of seed meters 3630-2 on each row unit.

Vacuum is preferably pulled in the vacuum side housing 340 of each seed meter 340 via a vacuum port 342. Each vacuum port 340 is preferably in fluid communication with a vacuum source 170 (e.g., a vacuum impeller) via a vacuum splitter 3650. The vacuum splitter 3650 preferably includes a vacuum port 3652 in fluid communication with the vacuum source 170, e.g., via flexible tubing. The vacuum splitter 3650 preferably includes a first splitter port 3654 in fluid communication with the vacuum port 340-1 of the seed meter 3630-1. The vacuum splitter 3650 preferably includes a second splitter port 3656 in fluid communication with the vacuum port 340-2 of the seed meter 3630-2.

Figure 37:
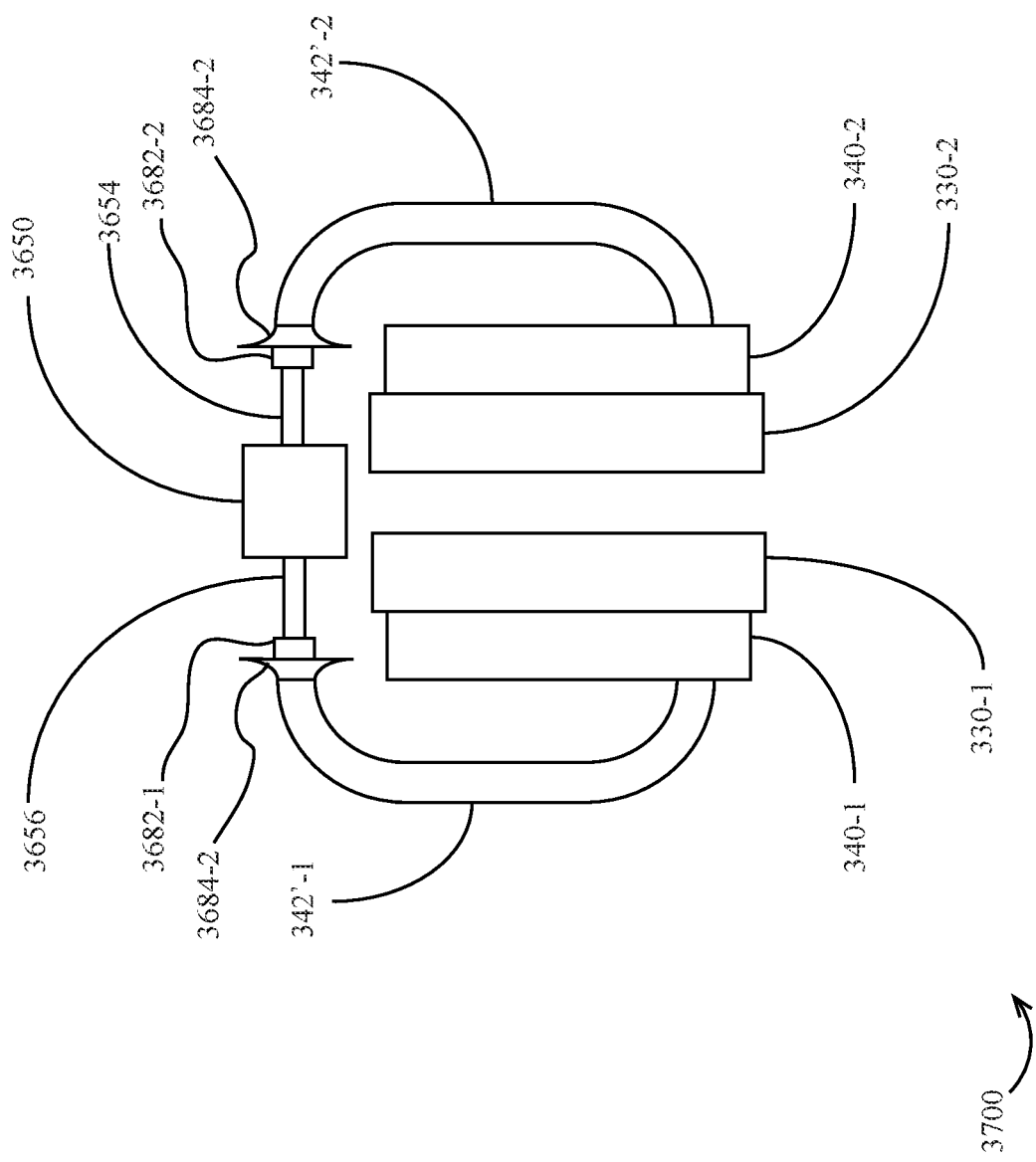
FIG. 37 illustrates still another embodiment of a row unit.

In another embodiment illustrated in FIG. 37, in connection with the previous embodiments, each seed meter 330, identified by reference numerals 330-1, 330-2, and vacuum housing 340, identified by reference numerals 340-1, 340-2, each vacuum housing 340 including a modified vacuum port 342'. In some embodiments the vacuum port 342' is substantially rigid. The vacuum port 342' preferably forms a sealed fluid coupling with the outlet splitter port (e.g., 3654 or 3656). The outlet splitter port (e.g., 3654 or 3656) is preferably fluidly coupled to the vacuum port 342' as the vacuum side housing 340 is attached to the seed side housing 330. The outlet splitter port (e.g., 3654 or 3656) is preferably fluidly decoupled from the vacuum port 342' as the vacuum side housing 340 is removed from the seed side housing 330. In the illustrated embodiment, the outlet splitter port (e.g., 3654 or 3656) is fluidly coupled to the vacuum port 342' via contact between a resilient insertion member 3682 having a flexible annular flange (not shown) and a rigid receiving funnel 3684; as the insertion member enters the funnel, a vacuum seal is formed between the two elements. In some embodiments, the insertion member and funnel 3684 are similar to those in the pneumatic quick coupling disclosed in U.S. Pat. No. 4,843,983, incorporated herein in its entirety by reference.

Returning to the row unit 3600 of FIG. 36, in some embodiments the row unit includes a common input 3670 through which a central processor or controller is placed in data (e.g., electrical) communication with two connectors 3671. Each connector 3671 is preferably configured to be placed in data (e.g., electrical) communication with one of the drives 315. In one embodiment, the common input 3670 comprises a four-pin connector. A first and second pin are each in communication with high and low bus (e.g., CAN) communication lines which preferably carry motor speed commands and encoder measurements to the drive 315-1 associated with seed meter 3630-1. A third and fourth pin are each in communication with high and low bus (e.g., CAN) communication lines which preferably carry motor speed commands and encoder measurements to the drive 315-2 associated with seed meter 3630-2.

Figure 38:
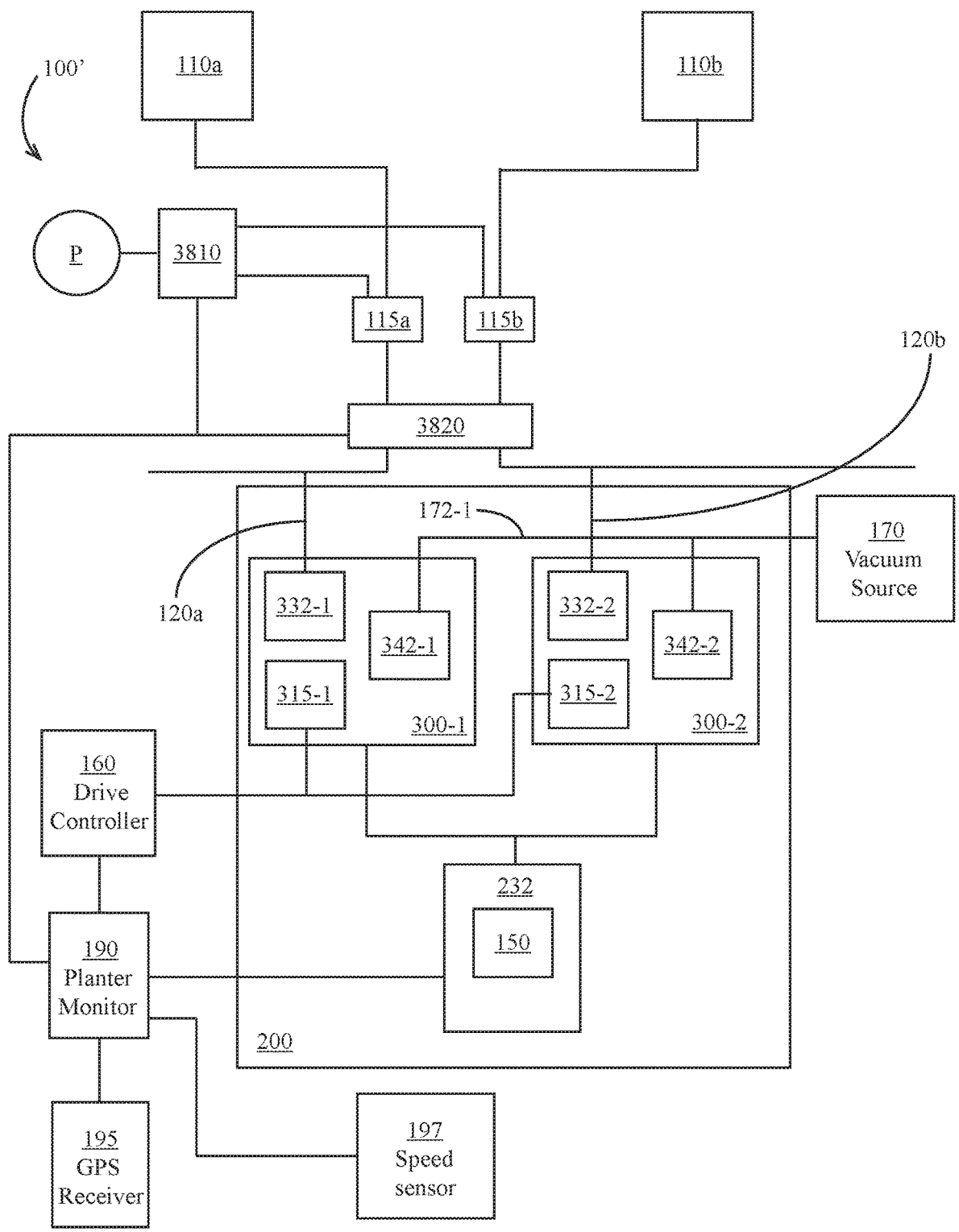
FIG. 38 illustrates another embodiment of a seed variety selection system.

Turning to FIG. 38, an alternative variety selection system 100' is illustrated schematically. In addition to the components of the variety selection system 100 described above, the alternative variety selection system 100' preferably includes one or more reducing actuators. The reducing actuators are preferably disposed and configured to reduce seed flow to a subset of row units on the implement; for example, the reducing actuators may reduce seed and/or air flow to or from one or more bulk tanks on the implement.

An upstream reducing actuator 3810 may be provided upstream of and in fluid communication with the entrainers 115 for selectively reducing air flow from the pressure source P (e.g., an impeller) to one or both of the entrainers 115. In some embodiments, the reducing actuator 3810 comprises a single reducing device (e.g., a reducing device having an inlet in fluid communication with the pressure source P, a first outlet in fluid communication with the first entrainer 115a, and a second outlet in fluid communication with the second entrainer 115b), while in others the reducing actuator 3810 may comprise two devices (e.g., a first reducing device in fluid communication with a pneumatic line fluidly connecting the pressure source P and the first entrainer 115a and a second reducing device in fluid communication with a pneumatic line fluidly connecting the pressure source P and the second entrainer 115*b*).

A downstream reducing actuator 3820 may additionally or alternatively be provided downstream of and in fluid communication with the entrainers 115 for selectively reducing air flow from one or both of the entrainers 115 to the seed meters 300. In some embodiments, the reducing actuator 3820 comprises a single reducing device or a plurality of reducing devices.

The reducing device or reducing devices of the reducing actuators 3810, 3820 may comprise a device suited to reduce (e.g., block, divert or vent) air flow to a subset of seed meters 300. As non-limiting examples, the reducing device may comprise a selectively positionable valve (e.g., an on-off valve, a directional valve, or a butterfly valve) or a selectively positionable vent or gate. The reducing valve may vent air from a pneumatic line to atmosphere, reduce an amount of air permitted to enter a pneumatic line, or direct air toward a first pneumatic line and away from a second pneumatic line.

The reducing actuators 3810, 3820 preferably additionally include actuating devices for selectively modifying a position or other operating characteristic of the reducing device in order to select a position of the reducing device and thus selectively reduce air flow to a subset of seed meters. Each actuating device is preferably in data (e.g., electrical) communication with the planter monitor 190; the planter monitor preferably sends command signals to the actuating device in order to select a position or operating characteristic of the reducing device. The actuating devices may comprise an electrically-operated spool (e.g., for changing a position of a valve), an electrically-operated linear actuator, an electric motor (e.g., for changing the position of a vent, gate or valve).

In operation, one or both of the reducing actuators 3810, 3820 are preferably actuated in order to reduce flow to a subset of seed meters that are not planting and/or will not be planting seed until a threshold time or distance passes, or will plant less than a threshold amount of seed over the next threshold time period or distance; this actuation preferably reduces the amount of seed built up in non-planting seed meters and in pneumatic lines fluidly connecting an entrainer to a non-planting seed meter. For example, if only one type of seed will be planted in the next 50 yards of implement travel, a reducing actuator is preferably actuated such that air flow through the entrainer associated with the other type of seed is reduced. In some embodiments, the reducing actuators are actuated manually by the operator. In other embodiments, the operator enters a user input into the planter monitor 190 such that the planter monitor sends a command signal to the reducing actuator causing the reducing actuator to reduce flow to the non-planting seed meters. In a preferred embodiment illustrated in FIG. 39, the planter monitor automatically actuates the reducing actuator or reducing actuators.

Figure 39:
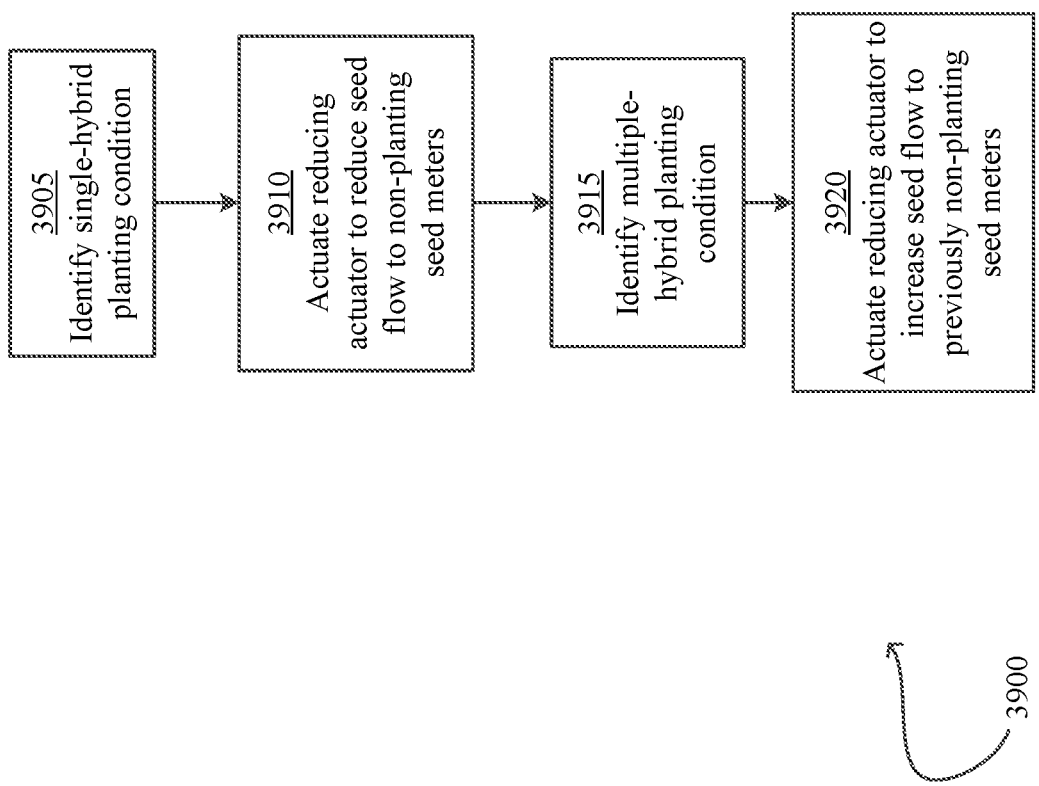
FIG. 39 illustrates an embodiment of a process for actuating a reducing actuator.

Turning to FIG. 39, a process 3900 for actuating a reducing actuator is illustrated. At step 3905, the planter monitor 190 preferably identifies a single-hybrid planting condition (e.g., an operating condition in which it is desirable to reduce flow of seeds to a subset of seed meters). The single-hybrid planting condition may comprise an operating condition in which seed from only one of the bulk hoppers 110 is being planted or has been planted during a preceding time period, planting area or travel distance. The single-hybrid planting condition may comprise an operating condition in which less than a threshold amount of seeds (e.g., seeds per acre, seeds per time, seeds per distance) from one of the bulk hoppers 110 is being planted or has been planted during a preceding time period, planting area or travel distance. The single-hybrid planting condition may comprise an operating condition in which none or less than a threshold amount of seeds (e.g., seeds per acre, seeds per time, seeds per distance) will be planted.

Turning to FIG. 39, a process 3900 for actuating a reducing actuator is illustrated. At step 3905, the planter monitor 190 preferably identifies a single-hybrid planting condition (e.g., an operating condition in which it is desirable to reduce flow of seeds to a subset of seed meters). The single-hybrid planting condition may comprise an operating condition in which seed from only one of the bulk hoppers 110 is being planted. The single-hybrid planting condition may comprise an operating condition in which none or less than a threshold amount of seed is predicted to be planted from one of the bulk hoppers 110 over the following threshold time or travel distanced. The amount of seed predicted to be planted from each of the bulk hoppers 110 may be estimated based on a plurality of inputs including a prescription map (e.g., a multiple-hybrid prescription map associating seeding rates and seed types with each location in the field), the position of the implement, the travel direction of the implement, and the travel speed of the implement (e.g., the current travel speed or the average travel speed over a preceding threshold time). As an illustrative example, the planter monitor 190 may estimate that no seeds are going to be planted from the bulk hopper 110*a* during the next 40 yards of travel distance by determining that the prescription map does not call for the seed type in bulk hopper 110*a* to be planted in any location along the travel direction of the implement between the current location of the implement and 40 yards from the current location of the implement. If the threshold minimum distance used to identify a single-hybrid planting condition is greater than 40 yards (e.g., 50 yards), then the planter monitor 190 preferably identifies a single-hybrid planting condition.

At step 3910, once a single-hybrid planting condition has been identified, the planter monitor 190 preferably sends a command signal commanding the reducing actuator to change an operating state such that seed and air flow is reduced to the seed meters in communication with the bulk hopper having the seed type that was not being planted, is not being planted or is not predicted to be planted as described in step 3905. For example, a gate, valve or vent may be moved in order to reduce or stop flow to the non-planting bulk hopper.

At step 3915, the planter monitor identifies a multiple-hybrid planting condition (e.g., a planting condition in which a single-hybrid condition as described in step 3905 cannot be identified.)

At step 3920, upon identifying a multiple-hybrid planting condition, the planter monitor 190 preferably sends a command signal commanding the reducing actuator to change an operating state such that seed and air flow is restored to the seed meters (e.g., to the reducing actuator position prior to step 3910).

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A method of operating an agricultural seed planter, the agricultural seed planter comprising:
   a row unit configured to open a planting trench in a soil surface as the row unit advances in a forward direction of travel;
   a first seed meter having a first seed meter disc configured to meter and release a first seed therefrom for depositing into the planting trench; the first seed meter disc configured to rotate about a first axis of rotation in a first direction, the first axis of rotation oriented substantially perpendicular to the forward direction of travel of the row unit;
   a second seed meter having a second seed meter disc configured to meter and release a second seed therefrom for depositing into the planting trench, the second seed meter disc configured to rotate about a second axis of rotation in a second direction, the second axis of rotation oriented substantially perpendicular to the forward direction of travel of the row unit;
   a pressure source configured to produce an air flow to the first seed meter and the second seed meter;
   a first entrainer disposed to entrain the first seed with the air flow from the pressure source to communicate the entrained first seed to the first seed meter;
   a second entrainer disposed to entrain the second seed with the air flow from the pressure to communicate the entrained second seed to the second seed meter; and
   a reducing actuator disposed between the pressure source and the first entrainer and the second entrainer;
   the method comprising:
      switching from planting the first seed to planting the second seed by configuring the reducing actuator to reduce the air flow to the first seed meter in relation to the air flow to the second seed meter; and
      switching from planting the second seed to planting the first seed by configuring the reducing actuator to reduce the air flow the second seed meter in relation to the air flow to the first seed meter.

2. The method of claim 1, wherein the agricultural seed planter further comprises:
   a seed tube disposed to receive the first seed released from the first seed meter disc and disposed to receive the second seed released from the second seed meter disc, the seed tube configured to direct the released first seed and the released second seed to the planting trench, and
   at least one electric motor configured to control a rate at which the first seed is metered by the first seed meter disc and a rate at which the second seed is metered by the second seed meter disc.

3. The method of claim 1, further comprising directing the first seed and the second seed to the planting trench with a seed tube.

4. The method of claim 1, further comprising directing the first seed and the second seed to the planting trench with a seed conveyance device.

5. The method of claim 1, further comprising identifying a single-hybrid planting condition and generating a command to switch from planting the first seed to planting the second seed upon identifying the single-hybrid planting condition.

6. The method of claim 5, further comprising metering only one of the first seed or the second seed at one time during the single-hybrid planting condition.

7. The method of claim 5, further comprising metering only one of the first seed or the second seed while traversing a travel distance during the single-hybrid planting condition.

8. The method of claim 1, further comprising venting the air flow to atmosphere through the reducing actuator.

9. The method of claim 1, wherein no seeds flow through the reducing actuator.

10. The method of claim 1, wherein the second direction is opposite the first direction.

11. The method of claim 10, wherein the first seed meter disc releases the first seed forwardly of the first axis of rotation relative to the forward direction of travel of the row unit.

12. The method of claim 11, wherein the second seed meter disc releases the second seed rearward of the second axis of rotation relative to the forward direction of travel of the row unit.

13. A method of operating an agricultural seed planter, the method comprising:
   opening a planting trench in a soil surface with a row unit while advancing the row unit in a forward direction of travel, the row unit comprising:
      a first seed meter comprising a first seed meter disc configured to rotate about a first axis of rotation in a first direction to meter and release a first seed type into the planting trench, the first axis of rotation oriented substantially perpendicular to the forward direction of travel;
      a second seed meter comprising a second seed meter disc configured to rotate about a second axis of rotation in a second direction to meter and release a second seed type into the planting trench, the second axis of rotation oriented substantially perpendicular to the forward direction of travel;
   providing an air flow from a pressure source to the first seed meter and the second seed meter;
   entraining seeds of the first seed type in a first entrainer with the air flow from the pressure source to communicate the entrained seeds of the first seed type to the first seed meter;
   planting the seeds of the first seed type in the planting trench;
   switching the row unit from planting the first seed type in the planting trench to planting the second seed type in the planting trench by configuring a reducing actuator to reduce air flow to the first seed meter in relation to air flow to the second seed meter;
   entraining seeds of the second seed type in a second entrainer with the air flow from the pressure source to communicate the entrained seeds of the second seed type to the second seed meter; and
   planting the seeds of the second seed type in the planting trench.

14. The method of claim 13, further comprising switching from planting the second seed type to planting the first seed type by configuring the reducing actuator to reduce the air flow to the second seed meter in relation to the air flow to the first seed meter.

15. The method of claim 13, further comprising controlling a rate at which the first seed type is metered by the first seed meter disc and a rate at which the second seed type is metered by the second seed meter disc with at least one electric motor.

16. The method of claim 13, further comprising further comprising directing the seeds of the first seed type and the seeds of the second seed type to the planting trench with a seed tube.

17. The method of claim 13, further comprising further comprising directing the seeds of the first seed type and the seeds of the second seed type to the planting trench with a seed conveyance device.

18. The method of claim 13, wherein configuring the reducing actuator to reduce air flow to the first seed meter in relation to air flow to the second seed meter comprises moving the reducing actuator from a first position to a second position.

19. The method of claim 13, further comprising identifying a single-hybrid planting condition and generating a command to switch from planting the first seed type to planting the second seed type upon identifying the single-hybrid planting condition.

20. The method of claim 19, further comprising metering only one of the first seed or the second seed at one time during the single-hybrid planting condition.

* * * * *